(12) United States Patent
Saini

(10) Patent No.: US 9,710,639 B1
(45) Date of Patent: Jul. 18, 2017

(54) SINGLE INPUT UNLOCK FOR COMPUTING DEVICES

(71) Applicant: Google Inc., Mountain View, CA (US)

(72) Inventor: Gaurav Saini, Chandigarh (IN)

(73) Assignee: Google Inc., Mountain View, CA (US)

(*) Notice: Subject to any disclaimer, the term of this patent is extended or adjusted under 35 U.S.C. 154(b) by 32 days.

(21) Appl. No.: 14/853,441

(22) Filed: Sep. 14, 2015

(51) Int. Cl.
*G06F 12/00* (2006.01)
*G06F 21/36* (2013.01)
*G06F 3/0488* (2013.01)
*G06F 3/0484* (2013.01)
*G06F 3/041* (2006.01)

(52) U.S. Cl.
CPC ............ *G06F 21/36* (2013.01); *G06F 3/0412* (2013.01); *G06F 3/0416* (2013.01); *G06F 3/0484* (2013.01); *G06F 3/04883* (2013.01)

(58) Field of Classification Search
CPC .......... G06F 21/30; G06F 21/36; G06F 21/44; G06F 21/45; G06F 21/316; G06F 21/604; G06F 3/0412; G06F 3/0416; G06F 3/0484; G06F 3/04883
USPC .......... 726/2–7, 17–19, 26–30; 713/168, 193
See application file for complete search history.

(56) References Cited

U.S. PATENT DOCUMENTS

| | | | |
|---|---|---|---|
| 7,877,707 B2 * | 1/2011 | Westerman | G06F 3/04883 715/863 |
| 8,576,173 B2 | 11/2013 | Verhaegh | |
| 8,624,841 B2 | 1/2014 | Kim et al. | |
| 8,910,079 B2 | 12/2014 | Yoo | |
| 9,110,510 B2 * | 8/2015 | Moore | G06F 3/017 |
| 9,338,274 B2 * | 5/2016 | Gao | G06F 3/038 |
| 9,342,673 B2 * | 5/2016 | Tungare | G06F 21/31 |
| 2014/0078318 A1 | 3/2014 | Alameh | |

* cited by examiner

*Primary Examiner* — Hosuk Song
(74) *Attorney, Agent, or Firm* — Shumaker & Sieffert, P.A.

(57) ABSTRACT

A device is described that, while operating in a lock-sensitive display. Responsive to detecting, and while receiving the first portion, the device displays a plurality of input nodes including a first node at the initial location and a second node at a subsequent location. Responsive to detecting the first portion of the continuous-gesture input at the subsequent location, the device receives a second portion of the gesture beginning at the subsequent location and ending at a final location where a third node is displayed. Based on the second portion of the gesture, the device determines an ordered-selection of input nodes beginning with the second node and ending with the third node. Responsive to determining that the ordered-selection satisfies an unlock sequence, the device transitions to operating an unlocked-state where the device displays a graphical user interface.

20 Claims, 13 Drawing Sheets

SINGLE INPUT UNLOCK FOR COMPUTING DEVICES

BACKGROUND

Some computing devices rely on lock screen graphical user interfaces as a way to prevent access to certain information and/or operations of the computing device while the computing device is in a locked-state. Upon receiving a request to "unlock" the computing device, the computing device may exit the locked-state and enter an unlocked-state. For example, while operating in a locked-state, the computing device may receive a first user input that causes the computing device to wake-up a display and present a lock screen graphical user interface. The computing device may subsequently receive a second user input associated with a password, a pin, an unlock pattern, or other credential necessary for authenticating the user and "unlocking" the computing device. After a user input is authenticated, the computing device may transition to the unlocked-state in which the computing device may allow the user to access information and/or operations of the computing device (e.g., interact with one or more applications executing on the computing device).

DETAILED DESCRIPTION

In general, this disclosure is directed to techniques for enabling a computing device to recognize a single, continuous-gesture as both an input for causing the computing device to display an unlock feature of a lock screen and an input for authenticating the user to unlock the computing device. For example, a computing device may operate in a locked-state in which the computing device prevents a user from accessing at least some information and/or operations of the computing device. While locked, the computing device may cause a presence-sensitive display to operate in a low-power mode (e.g., by switching—the display off, causing the display to present a screen saver graphical user interface, etc.).

Responsive to detecting a continuous-gesture that begins at an initial location of the presence-sensitive display, the computing device may wake up the display and cause the display to present a lock screen graphical user interface (GUI). The lock screen GUI may include a plurality of input nodes that can be individually selected, in a particular order, by a continuous-gesture to cause the computing device to authenticate the user and transition to an unlocked mode. The computing device may cause the display to present a first node of the plurality of nodes at or near the initial location at which the continuous-gesture began. For example, the first node may be a central node that is displayed by the presence-sensitive display equidistant from each of the other input nodes.

After presenting the plurality of nodes, the computing device may determine when the continuous-gesture has moved to a subsequent location of the presence-sensitive display at which a second node is displayed. Responsive to detecting the continuous-gesture at the second node, the computing device may discard a first portion of the continuous-gesture (e.g., the portion of the gesture received between the initial location and the location of the second node) and begin utilizing a second portion of the continuous-gesture, beginning from the subsequent location onward, as an input for authentication. When the continuous-gesture ends, the computing device may determine an ordered-selection of input nodes based only on the second portion, and not the first portion, of the continuous-gesture.

Responsive to determining that the ordered-selection satisfies an unlock sequence, the computing device may transition from operating in the locked-state to operating in an unlocked-state in which the computing device allows a user to access at least a portion of the information and/or operations previously protected while the computing device was operating in the locked-state. For instance, while the computing device is operating in the unlocked-state, the computing device may present a graphical user interface associated with an operating system, a notification center, or one or more other applications or services executing at the computing device.

Figure 1:
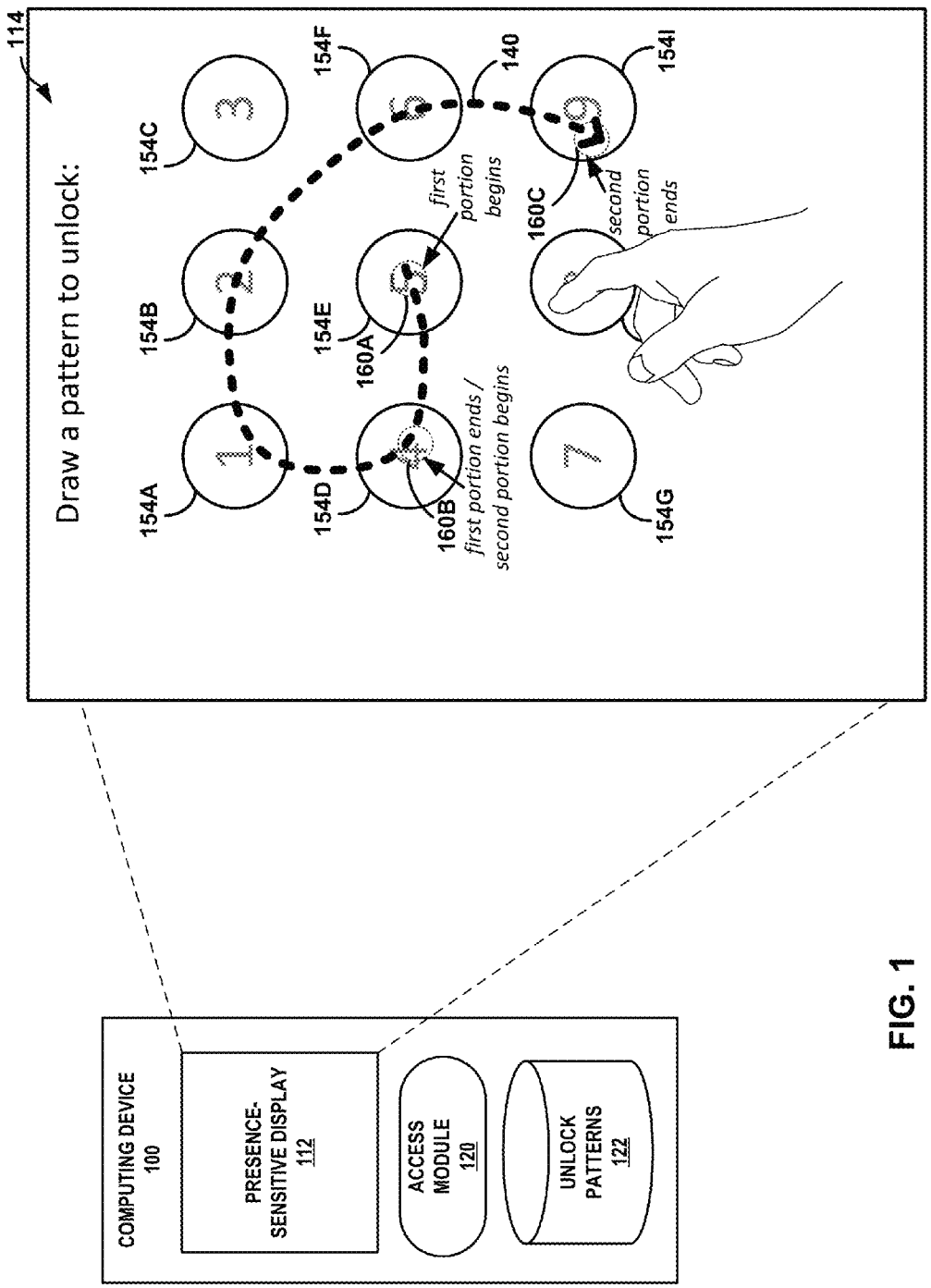
FIG. 1 is a conceptual diagram illustrating an example computing device configured to provide a lock screen graphical user interface, in accordance with techniques of this disclosure.

FIG. 1 is a conceptual diagram illustrating computing device 100 as an example computing device configured to provide a lock screen graphical user interface, in accordance with techniques of this disclosure. In the example of FIG. 1, computing device 100 may be a wearable computing device (e.g., a computerized watch or so-called smart watch device, a fitness tracker, computerized hand or eyewear), a mobile device (e.g., a mobile phone, a tablet computer, a personal digital assistant (PDA), a laptop computer, a portable gaming device, a portable media player, an e-book reader, an automobile computing platform or system), a stationary device (e.g., a television platform, a server, a mainframe computer, a desktop computer), or any other type of mobile or non-mobile, wearable or non-wearable computing device configured to receive continuous-gesture inputs from a user.

As used herein, the term "continuous-gesture input" or simply "continuous-gesture" refers to a single gesture input that includes a single "touch-down" event at a presence-sensitive display followed by a single "lift-off" event at the presence-sensitive display. In other words, a user may begin performing a "continuous-gesture input" by pressing at an initial location of a presence-sensitive display with a finger or stylus and end the continuous-gesture input as soon as the user lifts his finger or stylus off at a final location of the presence-sensitive display. A continuous-gesture input does not include more than one "touch-down" events or more than one "lift-off" events.

In some examples, the continuous-gesture input may be a continuous-gesture that contacts the presence-sensitive display. In other examples, the continuous-gesture input may be a contactless type continuous-gesture that comes near, but does not actually contact the presence-sensitive display. Accordingly, a touch-down and lift-off event associated with a contact type continuous-gesture may occur, respectively, when the user's finger or stylus touches and stops touching an input component of a presence-sensitive display. A touchdown and lift-off event associated with a contactless type continuous-gesture may occur, respectively, when the user's finger or stylus moves near and away from an input component of a presence-sensitive display.

Computing device 100 may include presence-sensitive display 112. Presence-sensitive display 112 of computing device 100 may function as an input component for computing device 100 and as an output component. Presence-sensitive display 112 may be implemented using various technologies. For instance, presence-sensitive display 112 may function as a presence-sensitive input component using a presence-sensitive screen, such as a resistive touchscreen, a surface acoustic wave touchscreen, a capacitive touchscreen, a projective capacitance touchscreen, a pressure sensitive screen, an acoustic pulse recognition touchscreen, a camera and display system, or another presence-sensitive screen technology. Presence-sensitive display 112 may function as an output component, such as a display device, using any one or more of a liquid crystal display (LCD), dot matrix display, light emitting diode (LED) display, organic light-emitting diode (OLED) display, e-ink, or similar monochrome or color display capable of outputting visible information to the user of computing device 100.

Presence-sensitive display 112 of computing device 100 may include an input component that can receive tactile user input from a user of computing device 100 and present output. Presence-sensitive display 112 may receive indications of the tactile user input by detecting one or more tap and/or non-tap gestures from a user of computing device 100 (e.g., as a user touches or points at or near one or more locations of presence-sensitive display 112 with a finger, a hand, or a stylus pen) and in response to the input, computing device 100 may cause presence-sensitive display 112 to present output. Presence-sensitive display 112 may present the output as part of a graphical user interface (e.g., screen shots 114) that may be related to functionality provided by computing device 100, such as a lock screen, a notification center, or other application user interface.

Computing device 100 may include access module 120 and unlock patterns data store 122. Module 120 may perform operations described herein using software, hardware, firmware, or a mixture of hardware, software, and/or firmware residing in and executing on computing device 100. Computing device 100 may execute module 120 with multiple processors and/or as a virtual machine executing on underlying hardware. In some examples, presence-sensitive display 112 and module 120 may be arranged remotely to, and remotely accessible from, computing device 100, for instance, as one or more network services that is accessible via a network cloud.

Access module 120 may cause presence-sensitive display 112 to both "wake" and present a lock screen graphical user interface (e.g., as shown by screen shot 114) in response to a single, continuous-gesture input. Access module 120 may validate the single, continuous-gesture input, in relation to the lock screen, to "unlock" computing device 100, and cause computing device 100 to transition from operating in a locked-state to operating in an unlocked-state.

As used herein the terms locked-state and unlocked-state are used to describe two different access states associated with computing device 100. While operating in a "locked-state", computing device 100 may restrict user access to certain information and/or features of computing device 100. In some examples, while operating in a locked-state, computing device 100 may operate in a low-power mode (e.g., by temporarily switching-off presence-sensitive display 112 or other components of computing device 100). In contrast, while operating in an "unlocked-state", computing device 100 may allow user access to at least a portion of the information and/or features of computing device 100 that are otherwise restricted while computing device 100 operates in a locked-state. In some examples, while operating in an unlocked-state, computing device 100 may operate in a high-power mode (e.g., by keeping presence-sensitive display 112 switched-on and switching-on other components of computing device 100).

As further used herein, the term "wake" and "sleep" are used to describe two different operating states associated with a presence-sensitive display, such as presence-sensitive display 112. Access module 120 may cause presence-sensitive display to "wake" by causing presence-sensitive display 112 to transition from operating in a low power state to operating in a high power state. Access module 120 may further cause presence-sensitive display to "wake" by causing presence-sensitive display 112 to enable or switch-on a display component or transition from operating in a mode in which presence-sensitive display 112 refrained from outputting graphical information for display to operating in a mode in which presence-sensitive display 112 began outputting graphical information for display. Conversely, access module 120 may cause presence-sensitive display to "sleep" by causing presence-sensitive display 112 to transition from operating in a high power state to operating in a low power state. Access module 120 may further cause presence-sensitive display to "sleep" by causing presence-sensitive display 112 to disable or switch-off a display component or transition from operating in a mode in which presence-sensitive display 112 was outputting graphical information for display to operating in a mode in which presence-sensitive display 112 refrains from outputting graphical information for display.

Access module 120 may cause presence-sensitive display 112 to present a lock screen graphical user interface including a plurality of input nodes 154A-154I (collectively referred to as "input nodes 154"). Each input node 154 represents a selectable graphical element (also referred to as "a graphical object" or "a graphical icon"). Although illustrated as circular shaped, selectable graphical elements, input nodes 154 may be any type of graphical element, object, or icon, such as other shapes, numbers, alphanumeric text, colors, patterns, graphical icons, or any combination thereof. In some examples, each one of input nodes 154 may correspond to a different integer, letter, or other alphanumeric character. For example, in the example of FIG. 1, each of input nodes 154 corresponds to a different one of the numerals one through nine.

Access module 120 may receive information associated with user input at presence-sensitive display 112 when presence-sensitive display 112 presents the lock screen graphical user interface. Access module 120 may authenticate the information received from presence-sensitive display 112 to determine whether to cause computing device 100 to transition out of the locked-state and into the unlocked-state.

Unlock patterns data store 122 includes information needed by access module 120 for authenticating user input. For example, unlock patterns data store 122 may include one or more pin codes, passcodes, or other input patterns or sequences that when entered by a user, configure computing device 100 to transition out of a locked-state. For example, data store 122 may include one or more sequences of integers associated with individual accounts of users of computing device 100.

In response to user input detected at presence-sensitive display 112, access module 120 may interpret information received from presence-sensitive display 112 as an ordered-selection of input nodes 154. Access module 120 may perform a look-up of the ordered-selection of input nodes 154 (or the integer sequence associated with the ordered-selection) at data store 122. Access module 120 may compare the ordered-selection to an unlock sequence stored at unlock patterns data store 122, and authenticate the user that provided the user input if the ordered-selection corresponds to a stored unlock sequence. For example, if an integer sequence associated with an ordered-selection matches a integer sequence of a valid user stored at data store 122, access module 120 may cause computing device 100 to transition from operating in a locked-state to operating in an unlocked-state in which computing device 100 provides access to information and/or features of computing device 100 that are associated with the account of the valid user.

In operation, while computing device 100 operates in a locked-state, computing device 100 detects a user providing continuous-gesture input 140 at or near location 160A of presence-sensitive display 112. For example, computing device 100 may operate presence-sensitive display 112 in a low-power mode or locked-state in which computing device 100 causes presence-sensitive display 112 to refrain from presenting information, or at least present information in a low-resolution or low-power mode.

While operating in the locked-state, presence-sensitive display 112 may detect presence of a user providing continuous-gesture input 140 as the user first begins to touch, press, or otherwise position his or her finger, at or near location 160A (e.g., an initial location) of presence-sensitive display 112. In response to detecting the initial press-down or touch event associated with the first portion of continuous-gesture input 140, presence-sensitive display 112 may output information indicative about continuous-gesture input 140 to access module 120. Access module 120 may determine a sequence of touch events based on the information received from presence-sensitive display 112. Each touch event in the sequence may include data about where, when, and from what direction that presence-sensitive display 112 detected continuous-gesture input 140.

Responsive to receiving the first portion of continuous-gesture input 140, access module 120 may output, for display at presence-sensitive display 112, a plurality of input nodes 154. For example, access module 120 may determine the initial location of presence-sensitive display 112 that is associated with the first portion of continuous-gesture input 140 corresponds to location 160A. To speed up entry of input for unlocking computing device 100, and so that a user does not need to provide multiple inputs to unlock computing device 100, access module 120 may cause presence-sensitive display 112 to present a first node (e.g., node 154E) of the plurality of input nodes 154 at the initial location of presence-sensitive display 112 at which continuous-gesture input 140 began. As shown in FIG. 1, in some examples, the first node is a central node of the plurality of input nodes however in other examples the first node may be any node of the plurality of input nodes 154. After computing device 100 causes presence-sensitive display 112 to present node 154E at location 160A and the other plurality of input nodes 154 surrounding node 154E, the user may continue providing the first portion of continuous-gesture input 140 by moving his or her finger or stylus from location 160A to location 160B.

Computing device 100 may receive, beginning at a subsequent location of presence-sensitive display 112 and ending at a final location of presence-sensitive display 112, a second portion of continuous-gesture input 140. For example, in the example of FIG. 1, the user may provide a second portion of continuous-gesture input 140 beginning at location 160B (e.g., the location of presence-sensitive display 112 at which node 154D is displayed) and ending at location 160C (e.g., the location of presence-sensitive display 112 at which node 154I is displayed).

While receiving the second portion of continuous-gesture input 140, access module 120 may analyze the touch events associated with continuous-gesture input 140 and determine each of the input nodes 154 that are displayed at locations of presence-sensitive display 112 which correspond to the locations of continuous-gesture input 140. For example, access module 120 may determine that the first portion of continuous-gesture input 140 sequentially traverses locations of a first input node 154E and a second input node 154D and that the second portion of continuous-gesture input 140 sequentially traverses locations of five input nodes beginning with the second input node 154D, followed by input nodes 154A, 154B, and 154F, and ending with a third input node 154I.

Access module 120 may determine, based only on the second portion of continuous-gesture input 140 and not the first portion of continuous-gesture input 140, an ordered-selection of input nodes from the plurality of input nodes 154 beginning with the second node 154D and ending with the third node 154I. In other words, to further simplify user input, access module 20 may discard the first portion of continuous-gesture input 140 that caused presence-sensitive display to "wake-up" and present input nodes 154, and only use the second portion of continuous-gesture input 140 for validation. Therefore, access module 120 may discard the selection of input node 154E and only include input nodes 154D, 154A, 154B, 154F, and 154I in the ordered-selection of input nodes 154. In this way, a user can provide a single continuous-gesture input to both wake-up and cause computing device 100 to present input nodes 154, as well as to unlock computing device 100.

Responsive to determining that the ordered-selection satisfies an unlock sequence, access module 120 may cause computing device 100 to transition from operating in the locked-state to operating in an unlocked-state. For example, access module 120 may look up the ordered selection at unlock patterns data store 122 and in response to determining that the ordered selection is a valid unlock sequence, trigger computing device 100 to switch operating states.

While the computing device is operating in the unlocked-state, computing device 100 may output, for display at presence-sensitive display 112, a graphical user interface associated with one or more applications of computing device 100. For example, access module 120 may cause presence-sensitive display 112 to present a graphical user interface associated with a notification center application of computing device 100, an operating system or home page of computing device 100, or any other graphical user interface that provides access to information and/or features of computing device 100 that are otherwise restricted while computing device 100 operates in a locked-state.

In this way, while operating in a locked-state, an example computing device may detect initial contact at a presence-sensitive display, and in response display a lock screen graphical user interface with an input pattern portion of the lock screen being aligned according to the location of the initial contact. To permit the user to enter an unlock pattern and unlock the computing device in a single continuous-gesture (e.g., without remove his finger after initial contact), the example computing device may discard the initial portion of the continuous-gesture input as the user moves his or her finger to an initial input node of the unlock sequence (e.g., an input node other than the node being displayed at the point of initial contact). In other words, after the user reaches the correct, initial input node of the unlock sequence, the computing device may begin validating the user input. The computing device may ignore the initial portion of the continuous-gesture input received before the correct, initial input node of the unlock sequence for validation purposes and only analyze the remaining portions of the continuous-gesture input for validation.

By enabling a computing device to receive a single, continuous-gesture input to wake-up, display a lock screen, and also unlock the computing device, the techniques of this disclosure may minimize user interaction required to transition a device from a locked-state to an unlocked-state. A computing device that operates according to the techniques of this disclosure may receive fewer inputs to unlock the computing device than other devices that require multiple, separate user inputs to wake and unlock the computing device. In addition, a user may be able to unlock such a device faster (e.g., with a single, continuous-gesture) then users of other devices that must provide at least two inputs to first wake-up and then unlock a device. A computing device that operates according to the techniques may therefore consume less power as compared to other computing devices.

Figure 2:
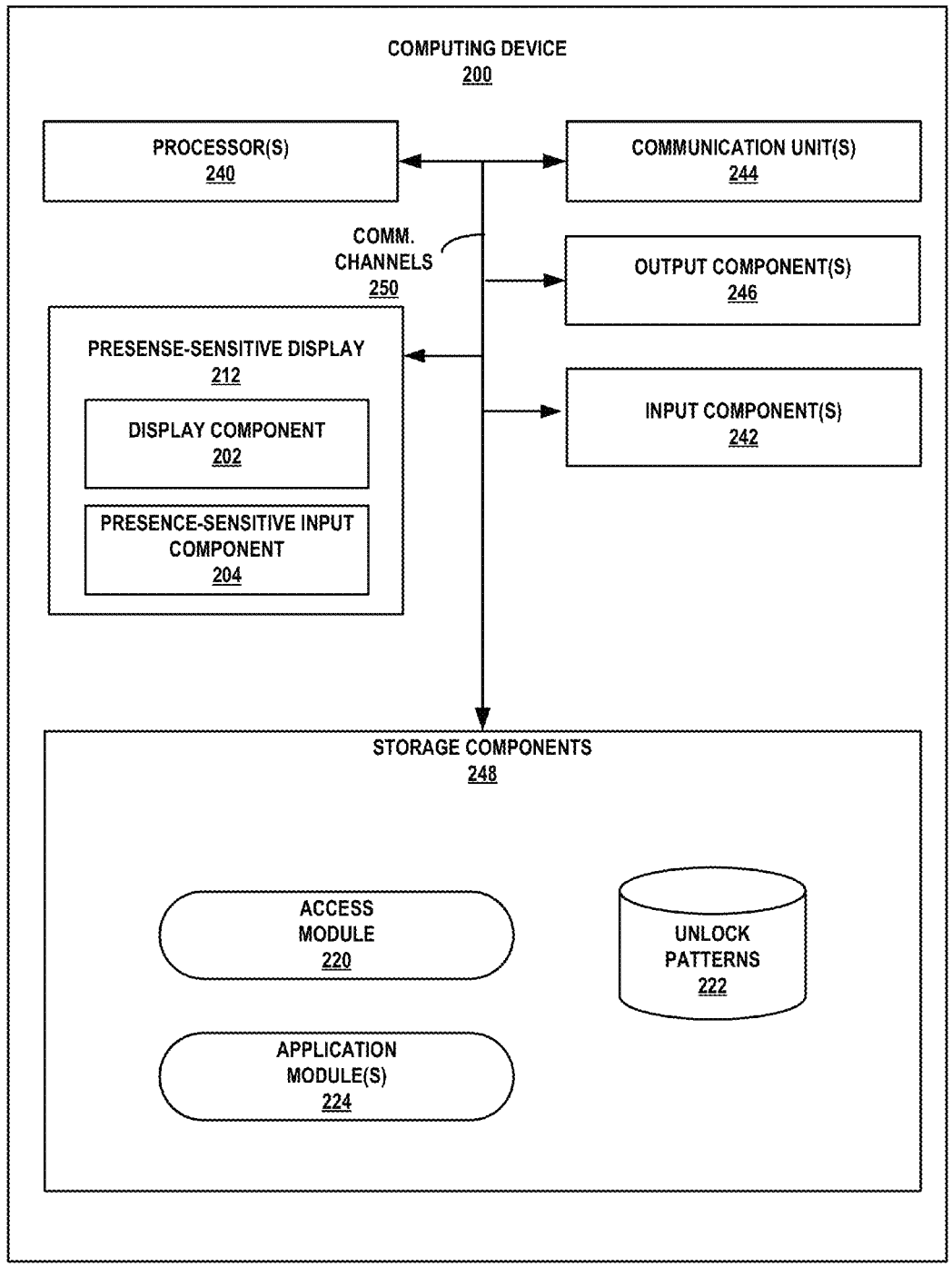
FIG. 2 is a block diagram illustrating an example computing device configured to provide a lock screen graphical user interface, in accordance with techniques of this disclosure.

FIG. 2 is a block diagram illustrating computing device 200 as an example computing device configured to provide a lock screen graphical user interface, in accordance with techniques of this disclosure. Computing device 200 of FIG. 2 is described below within the context of computing device 100 of FIG. 1. Computing device 200 of FIG. 2 in some examples represents an example of computing device 100 of FIG. 1. FIG. 2 illustrates only one particular example of computing device 200, and many other examples of computing device 200 may be used in other instances and may include a subset of the components included in example computing device 200 or may include additional components not shown in FIG. 2.

As shown in the example of FIG. 2, computing device 200 includes presence-sensitive display 212, one or more processors 240, one or more input components 242, one or more communication units 244, one or more output components 246, and one or more storage components 248. Presence-sensitive display 212 includes display component 202 and presence-sensitive input component 204. One or more storage components 248 of computing device 200 are configured to store access module 220, unlock patterns data store 222, and one or more application modules 224.

Communication channels 250 may interconnect each of the components 202, 204, 212, 220, 222, 224, 240, 242, 244, 246, and 248 for inter-component communications (physically, communicatively, and/or operatively). In some examples, communication channels 250 may include a system bus, a network connection, an inter-process communication data structure, or any other method for communicating data.

One or more input components 242 of computing device 200 may receive input. Examples of input are tactile, audio, image and video input. Input components 242 of computing device 200, in one example, includes a presence-sensitive display, touch-sensitive screen, mouse, keyboard, voice responsive system, a microphone or any other type of device for detecting input from a human or machine. In some examples, input components 242 include one or more sensor components such as one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., microphone, a still camera, a video camera, a body camera, eyewear, or other camera device that is operatively coupled to computing device 200, infrared proximity sensor, hygrometer, and the like).

One or more output components 246 of computing device 200 may generate output. Examples of output are tactile, audio, still image and video output. Output components 246 of computing device 200, in one example, includes a presence-sensitive display, sound card, video graphics adapter card, speaker, cathode ray tube (CRT) monitor, liquid crystal display (LCD), or any other type of device for generating output to a human or machine.

One or more communication units 244 of computing device 200 may communicate with external devices via one or more wired and/or wireless networks by transmitting and/or receiving network signals on the one or more networks. For example, communication units 244 may be configured to communicate over a network with a remote computing system that processes text input and performs word segmentation of text input using temporal and language model characteristics as described herein. Modules 220 and/or 222 may receive, via communication units 244, from the remote computing system, an indication of a character sequence in response to outputting, via communication unit 244, for transmission to the remote computing system, an indication of a sequence of touch events. Examples of communication unit 244 include a network interface card (e.g. such as an Ethernet card), an optical transceiver, a radio frequency transceiver, a GPS receiver, or any other type of device that can send and/or receive information. Other examples of communication units 244 may include short wave radios, cellular data radios, wireless network radios, as well as universal serial bus (USB) controllers.

Presence-sensitive display 212 of computing device 200 includes display component 202 and presence-sensitive input component 204. Display component 202 may be a screen at which information is displayed by presence-sensitive display 212 and presence-sensitive input component 204 may detect an object at and/or near display component 202. As one example range, presence-sensitive input component 204 may detect an object, such as a finger or stylus that is within two inches or less of display component 202. Presence-sensitive input component 204 may determine a location (e.g., an [x, y] coordinate) of display component 202 at which the object was detected. In another example range, presence-sensitive input component 204 may detect an object six inches or less from display component 202 and other ranges are also possible. Presence-sensitive input component 204 may determine the location of display component 202 selected by a user's finger using capacitive, inductive, and/or optical recognition techniques. In some examples, presence-sensitive input component 204 also provides output to a user using tactile, audio, or video stimuli as described with respect to display component 202. In the example of FIG. 2, presence-sensitive display 212 may present a user interface (such as a lock screen graphical user interface as shown in screen shots 114 of FIG. 1, a graphical user interface associated with one or more application modules 224, and/or a notification center graphical user interface, or any other type of graphical user interface).

While illustrated as an internal component of computing device 200, presence-sensitive display 212 may also represent and an external component that shares a data path with computing device 200 for transmitting and/or receiving input and output. For instance, in one example, presence-sensitive display 212 represents a built-in component of computing device 200 located within and physically connected to the external packaging of computing device 200 (e.g., a screen on a mobile phone). In another example, presence-sensitive display 212 represents an external component of computing device 200 located outside and physically separated from the packaging or housing of computing device 200 (e.g., a monitor, a projector, etc. that shares a wired and/or wireless data path with computing device 200).

Presence-sensitive display 212 of computing device 200 may receive tactile input from a user of computing device 200. Presence-sensitive display 212 may receive indications of the tactile input by detecting one or more tap or non-tap gestures from a user of computing device 200 (e.g., the user touching or pointing to one or more locations of presence-sensitive display 212 with a finger or a stylus pen). Presence-sensitive display 212 may present output to a user. Presence-sensitive display 212 may present the output as a graphical user interface (e.g., as screen shots 114 from FIG. 1), which may be associated with functionality provided by various functionality of computing device 200. For example, presence-sensitive display 212 may present various user interfaces of components of a computing platform, operating system, applications, or services executing at or accessible by computing device 200 (e.g., an electronic message application, a navigation application, an Internet browser application, a mobile operating system, etc.). A user may interact with a respective user interface to cause computing device 200 to perform operations relating to one or more the various functions. For example, access module 220 may cause presence-sensitive display 212 to present a lock screen graphical user interface. The user of computing device 200 may view the lock screen graphical user interface and provide continuous-gesture input to presence-sensitive display 112 to unlock computing device 200.

Presence-sensitive display 212 of computing device 200 may detect two-dimensional and/or three-dimensional gestures as input from a user of computing device 200. For instance, a sensor of presence-sensitive display 212 may detect a user's movement (e.g., moving a hand, an arm, a pen, a stylus, etc.) within a threshold distance of the sensor of presence-sensitive display 212. Presence-sensitive display 212 may determine a two or three dimensional vector representation of the movement and correlate the vector representation to a gesture input (e.g., a hand-wave, a pinch, a clap, a pen stroke, etc.) that has multiple dimensions. In other words, presence-sensitive display 212 can detect a multi-dimension gesture without requiring the user to gesture at or near a screen or surface at which presence-sensitive display 212 outputs information for display. Instead, presence-sensitive display 212 can detect a multi-dimensional gesture performed at or near a sensor which may or may not be located near the screen or surface at which presence-sensitive display 212 outputs information for display.

One or more processors 240 may implement functionality and/or execute instructions associated with computing device 200. Examples of processors 240 include application processors, display controllers, auxiliary processors, one or more sensor hubs, and any other hardware configure to function as a processor, a processing unit, or a processing device. Modules 220 and 224 may be operable by processors 240 to perform various actions, operations, or functions of computing device 200. For example, processors 240 of computing device 200 may retrieve and execute instructions stored by storage components 248 that cause processors 240 to perform the operations associated with modules 220 and 222. The instructions, when executed by processors 240, may cause computing device 200 to store information within storage components 248.

One or more storage components 248 within computing device 200 may store information for processing during operation of computing device 200 (e.g., computing device 200 may store data accessed by modules 220 and 224 during execution at computing device 200). In some examples, storage component 248 is a temporary memory, meaning that a primary purpose of storage component 248 is not long-term storage. Storage components 248 on computing device 220 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 248, in some examples, also include one or more computer-readable storage media. Storage components 248 in some examples include one or more non-transitory computer-readable storage mediums. Storage components 248 may be configured to store larger amounts of information than typically stored by volatile memory. Storage components 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 248 may store program instructions and/or information (e.g., data) associated with modules 220 and 224, as well as data stores 222. Storage components 248 may include a memory configured to store data or other information associated with modules 220 and 224, as well as data stores 222.

Access module 220 may include some or all functionality of access module 120 of computing device 100 of FIG. 1 and may perform similar operations as access module 120 for managing a user lock screen graphical user interface that computing device 200 provides at presence-sensitive display 212. Access module 220 may send information over communication channels 250 that cause display component 202 of presence-sensitive display 212 to present a plurality of input nodes that when selected by a continuous-gesture at presence-sensitive input component 204, form an ordered-selection for validating whether a user is authorized to have access to information and/or features of computing device 200 that are otherwise protected while operating in a locked-state. After validating an ordered-selection based on information stored at unlock patterns data store 222, access module 220 may cause computing device 200 to transition from operating in a locked-state to operating in an unlocked-state.

One or more application modules 224 may each perform various functions or provide access to one or more services accessed by computing device 200 (e.g., executing in a cloud computing environment). Each of application modules 224 may execute at as part of an operating system, platform, or other operating environment associated with computing device 200. Additionally, one or more application modules 224 may provide a graphical user interface (GUI) as part of their execution. For example, application modules 224 may cause presence-sensitive display 212 to display a respective graphical user interface. Examples of application modules 224 include: a notification service or a notification center from which information associated with a notification is presented and/or accessible, a communication or messaging application (e.g., for performing e-mail, text-based, telephone, voicemail, instant messaging, video chat, or other telecommunication related functions for computing device 200), a game application, an Internet browser application, a calendar application, a social media application, a map or navigation application, or any and all other types of applications that provide graphical content for display.

In some examples, while operating in a locked-state, a user may perform a predefined continuous-gesture input (e.g., with a finger or stylus) that remains in contact with input component 204 (e.g. a long press). Presence-sensitive display 212 may output information over communication channels 250 that access module 220 uses to determine whether to unlock computing device 200.

In response to receiving information about the predefined gesture detected at input component 204, access module 220 may cause display component 202 to display a plurality of input nodes, a pin entry area, or other lock screen graphical user interface. Access module 220 may cause display component 202 to align the input nodes, pin entry area, or other input area of the lock screen according to the location of the finger that is remaining in contact with input component 204. For example, as a default, a central input node of a nine pattern screen may be placed directly under a user's finger which remains in contact with input component 204. In some examples, a pin input space may similarly be aligned under a user's finger.

To allow the user to not have to remove his finger from input component 204 while entering an input pattern, a pin, or other unlock patter, access module 220 may automatically ignore a first portion of a continuous-gesture, after presenting the lock screen graphical user interface, up until the continuous-gesture input reaches a different input node or a different integer value of a pin input. Access module 220 may ignore the entire continuous-gesture input up until the continuous-gesture input reaches an initial input node or integer of an unlock sequence. After reaching the initial input node or integer of a unlock sequence, access module 220 may use the initial input node and the remaining nodes selected by the continuous-gesture input to build the unlock sequence and validate the user.

In some examples, after validating user input, and after computing device 200 transitions to an unlocked-state, access module 220 may configure computing device 200 to present a graphical user interface associated with one or more application modules 224. In some examples, after unlocking device 200, access module 220 may cause computing device 200 to present a notification center graphical user interface as the first screen the user views at presence-sensitive display 212.

In some examples, after access module 120 causes presence-sensitive display 212 to present the input nodes, if access module 220 fails to detect a selection of a first input node in the unlock sequence within a threshold amount of time (e.g., 5 seconds), then access module 220 may disregard the continuous-gesture input and cause presence-sensitive display 212 to refrain from presenting the input nodes and in some examples, go to sleep. In some examples, if the first node in an unlock sequence is also the same as the first node that access module 220 causes presence-sensitive display 212 to center the plurality of input nodes, access module 220 may immediately begin using the entire continuous gesture (e.g., both the first portion and the second portion) as an input for unlocking the device.

FIGS. 3A-3F are conceptual illustrations screen shots 314A-314F as example lock screen graphical user interfaces displayed by computing device 300, in accordance with techniques of this disclosure. Computing device 300 of FIGS. 3A-3F includes presence-sensitive display 312 and is described below within the context of computing device 100 of FIG. 1 and/or computing device 200 of FIG. 1. Computing device 300 in some examples represents an example of computing device 100 of FIG. 1, an example of computing device 200 of FIG. 2, or both.

Figure 3A:
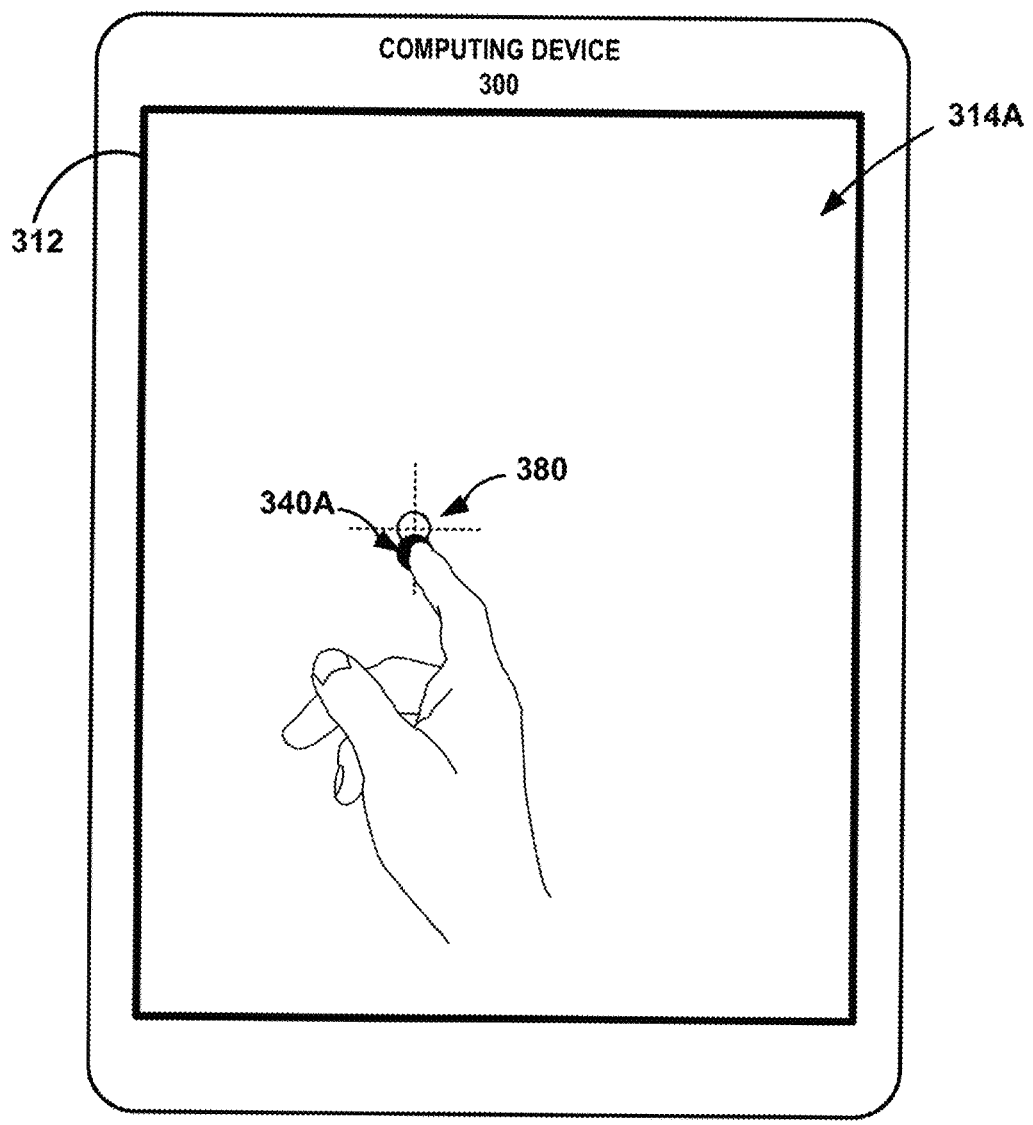
FIGS. 3A-3F are conceptual illustrations of an example lock screen graphical user interface, in accordance with techniques of this disclosure.

In the example of FIG. 3A, computing device 300 is operating in a locked-state. While operating in the locked-state, computing device 300 receives, beginning at location 380 of presence-sensitive display 312, portion 340A of continuous gesture 340. For example, a user of computing device 300 may perform a press-and-hold type gesture with a finger at location 380 of presence-sensitive display 312.

Figure 3B:
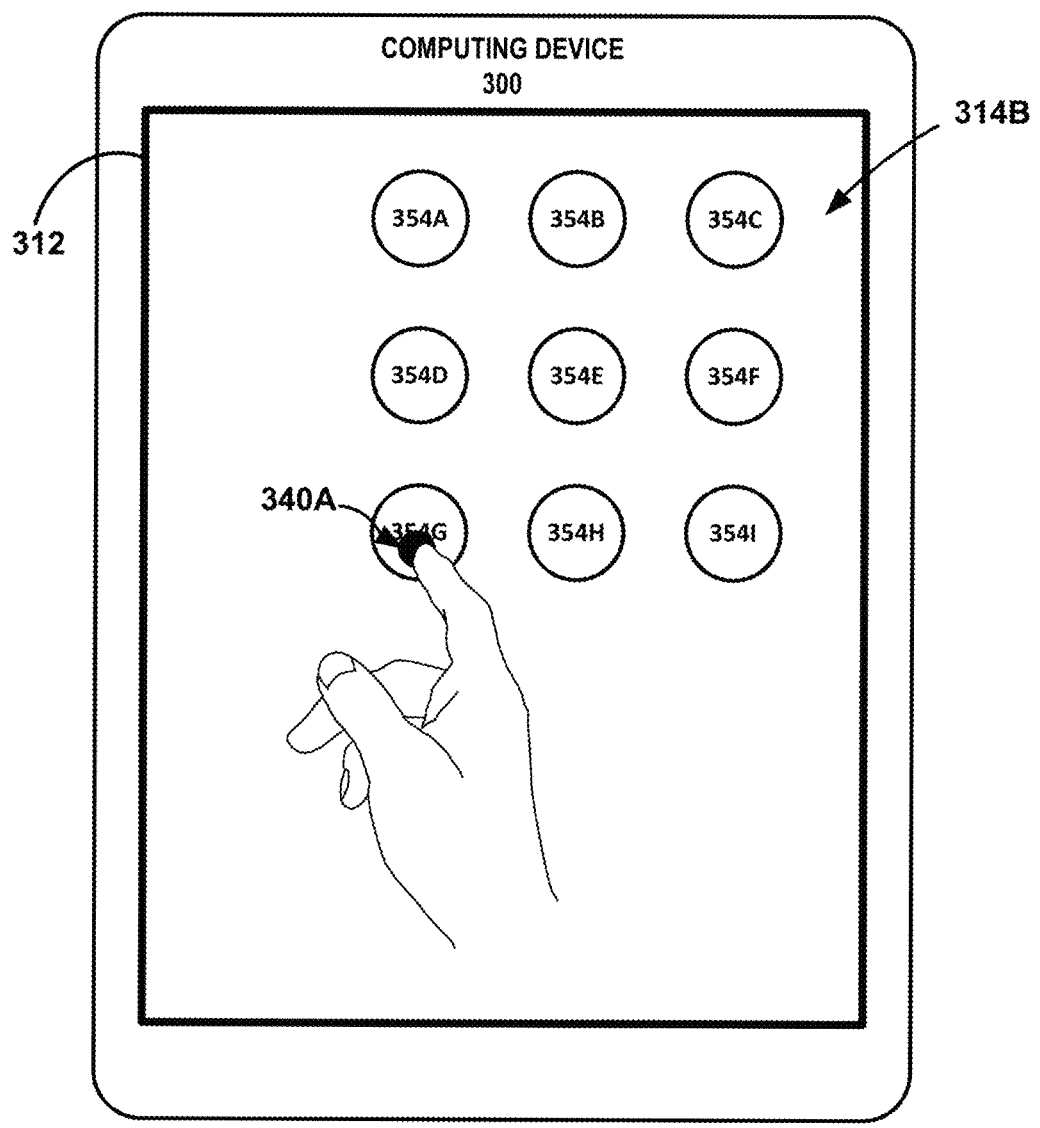

In the example of FIG. 3B, responsive to receiving portion 340A of continuous-gesture input 340, computing device 300 may output, for display at presence-sensitive display 312, a plurality of input nodes 354A-354I (collectively "input nodes 354"). Computing device 300 may cause presence-sensitive display 312 to present input node 354G at location 380 (at the initial location at which portion 340A was first received) and the other nodes 354 at subsequent locations. In some examples, computing device 100 may cause presence-sensitive display 312 to present a central node (e.g., input node 354E) or any other node at the initial location at which portion 340A was first received.

Figure 3C:
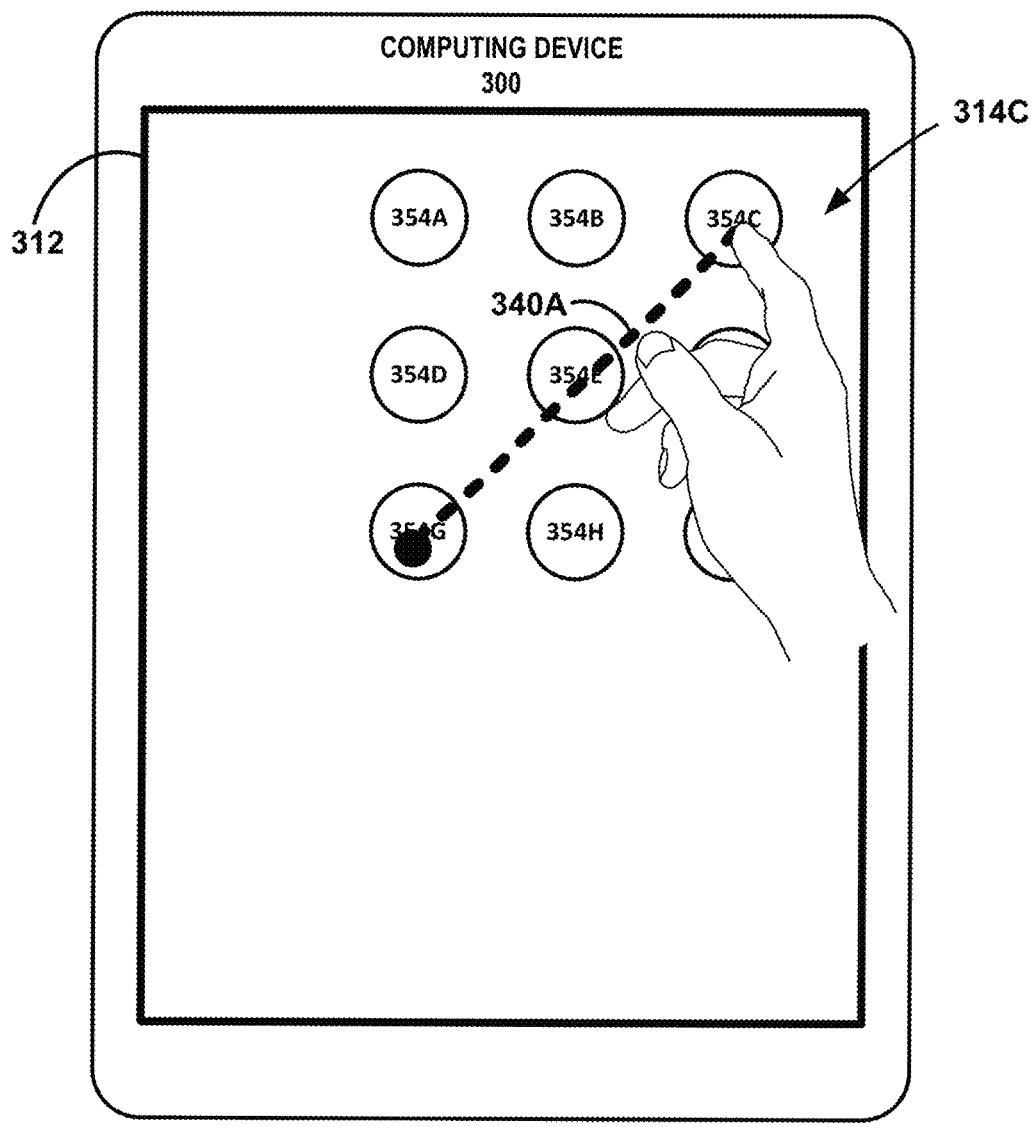
Figure 3D:
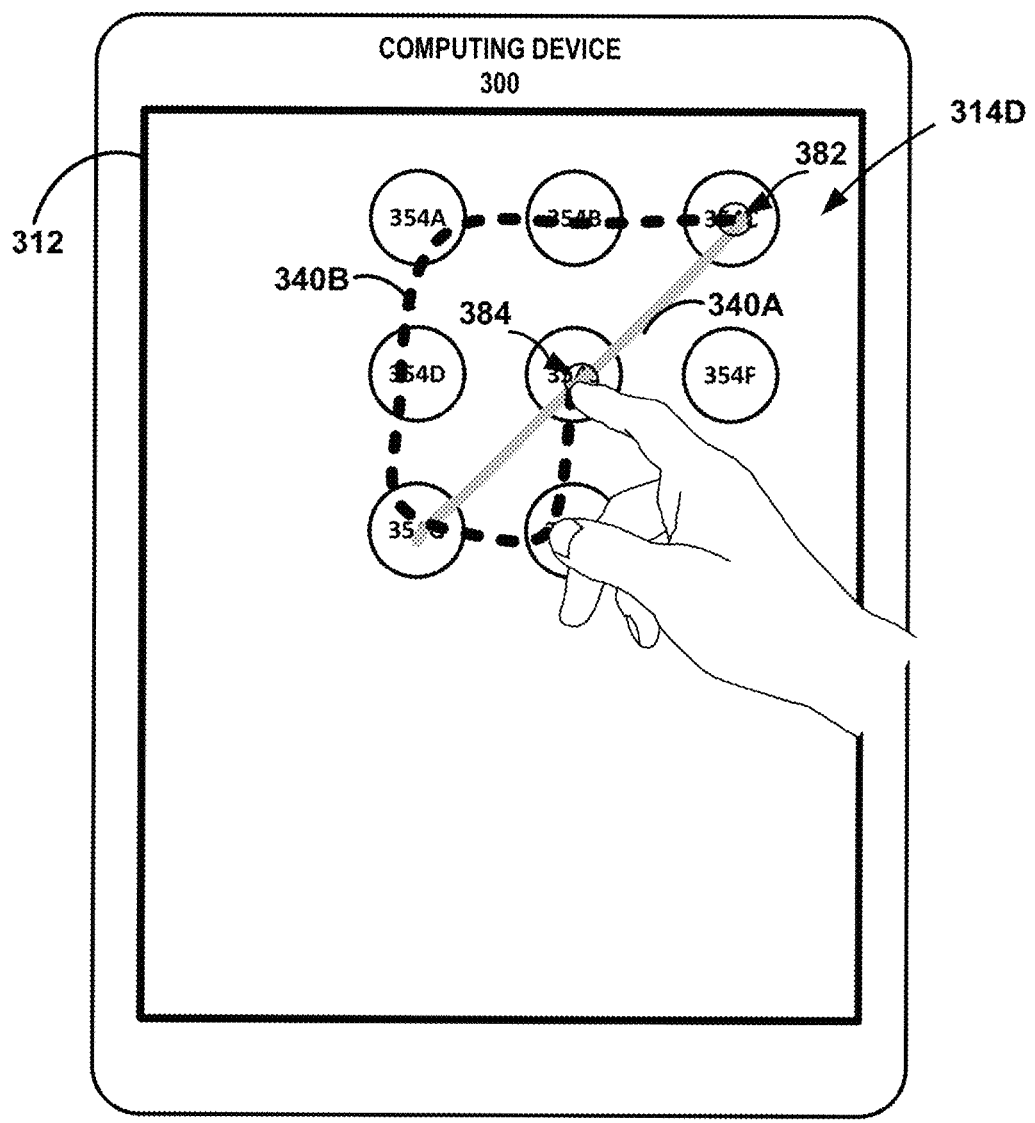

In the example of FIG. 3C, computing device 300 may continue to receive portion 340A of continuous-gesture input 340 as the user swipes across presence-sensitive display 312 and towards a location at which presence-sensitive display 312 displays input node 354C. In the example of FIG. 3D, computing device 300 may determine the end of portion 340A at location 382 and the beginning of portion 340B at location 382 in one of various ways.

In some examples, computing device 300 may detect an inflection point associated with portion 340A of continuous-gesture input 140 that occurs at a subsequent location at which an input node is displayed and may begin receiving portion 340B of the continuous-gesture input in response to detecting the inflection point. For example, computing device 300 may determine an inflection point in gesture 340 by detecting multiple, sequential touch events that abruptly change direction. Computing device 300 may ignore or discard touch events associated with continuous-gesture input 340 after the initial touch-down event at location 380, until computing device 300 detects an inflection point in gesture 340 at a location of presence-sensitive display 312 at which a node other than input node 354G is displayed. Computing device 300 may interpret the inflection point at location 382 (see FIG. 3D) as an indication from the user that he or she is beginning the portion of continuous-gesture input 340 that should be used for validation and may ignore or otherwise disregard any portions of continuous-gesture input 340 that crossed over or otherwise occurred at locations of other input nodes 345, such as node 354E. In other words, computing device 300 may ignore a selection of node 354E since portion 340A of continuous-gesture 340 does not include a pause, inflection point, etc.

In some examples, computing device 300 may detect a pause associated with portion 340A of continuous-gesture input 140 that occurs at a subsequent location at which an input node is displayed and may begin receiving portion 340B of the continuous-gesture input in response to detecting the pause. For example, computing device 300 may determine a pause in gesture 340 by detecting multiple, sequential touch events that have similar location components therefore indicate a lack of movement in gesture 340. Computing device 300 may ignore or discard touch events associated with continuous-gesture input 340 after the initial touch-down event at location 380, until computing device 300 detects pause in gesture 340 at a location of presence-sensitive display 312 at which a node other than input node 354G is displayed. Computing device 300 may interpret the inflection point at location 382 as an indication from the user that he or she is beginning the portion of continuous-gesture input 340 that should be used for validation.

In the example of FIG. 3D, computing device 300 may receive, beginning at location 382 and ending at location 384 of presence-sensitive display 312, portion 340B of continuous-gesture input 340. In some examples, portion 340B may end at an input node 354 that is the same input node 354 that was originally displayed under the beginning of portion 340A. In other examples, portion 340B may end at a different input node 354 than the input node 354 that was originally displayed under the beginning of portion 340A.

Although shown as having up-to seven nodes being selected by portion 340B, in other examples, less than seven or more than seven nodes may be selected that make up an ordered-selection. For example, in some instances, there are at least two nodes 354 being selected between the initial and final nodes 354 that are selected with portion 340B. In other words, in cases where the ordered-selection for unlocking computing device 300 includes four nodes 354, portion 340B may define a selection of four nodes beginning with the first node 354 associated with portion 340B, followed by two more nodes 354, and ending with a final, fourth node 354.

In any case, computing device 300 may determine, based on portion 340B of continuous-gesture input 340 and not based on portion 340A, an ordered-selection of input nodes 354 beginning with node 354C and ending input node 354E. Responsive to determining that the ordered-selection satisfies an unlock sequence, computing device 300 may transition from operating in the locked-state to operating in an unlocked-state.

Figure 3E:
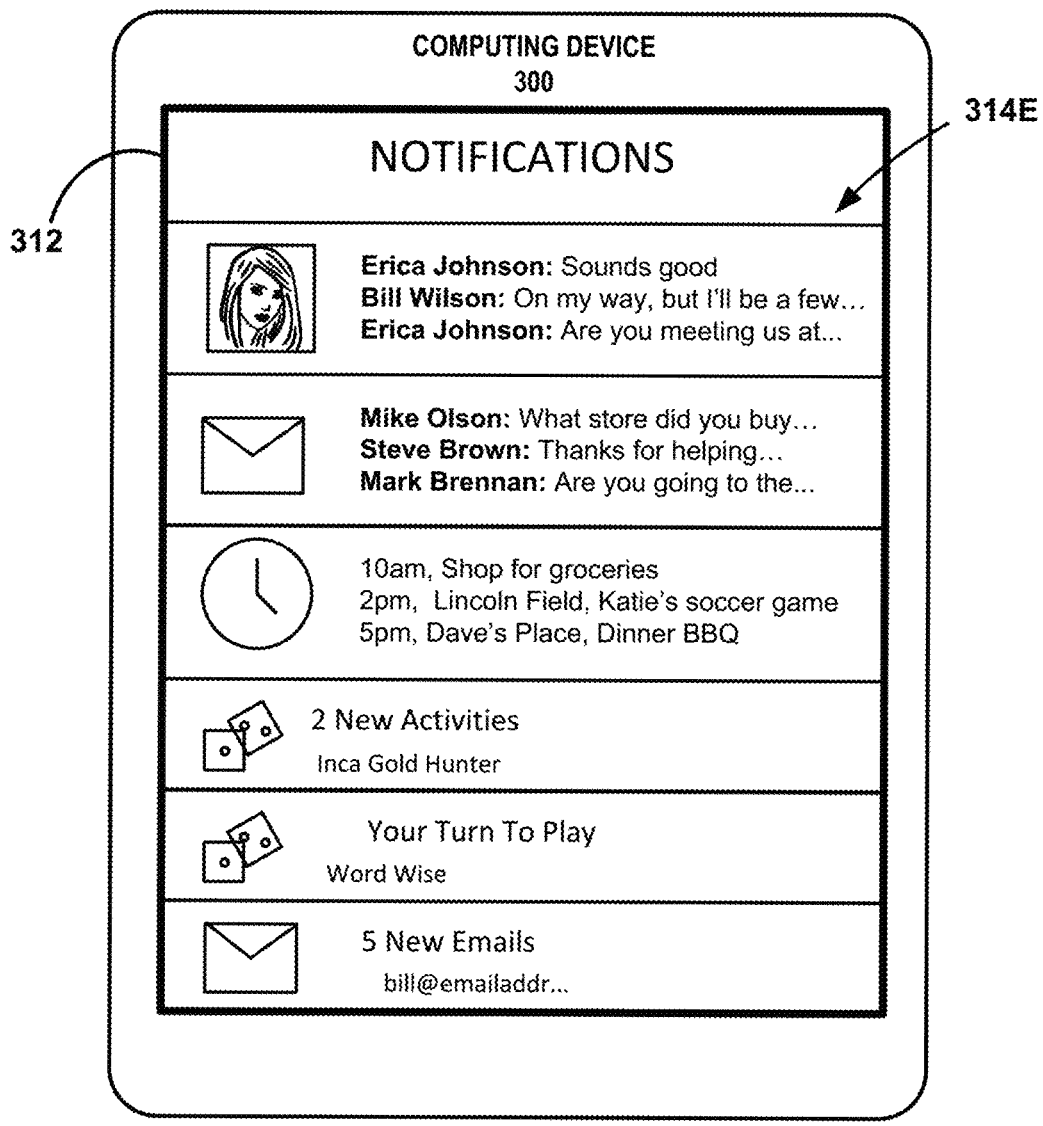
Figure 3F:
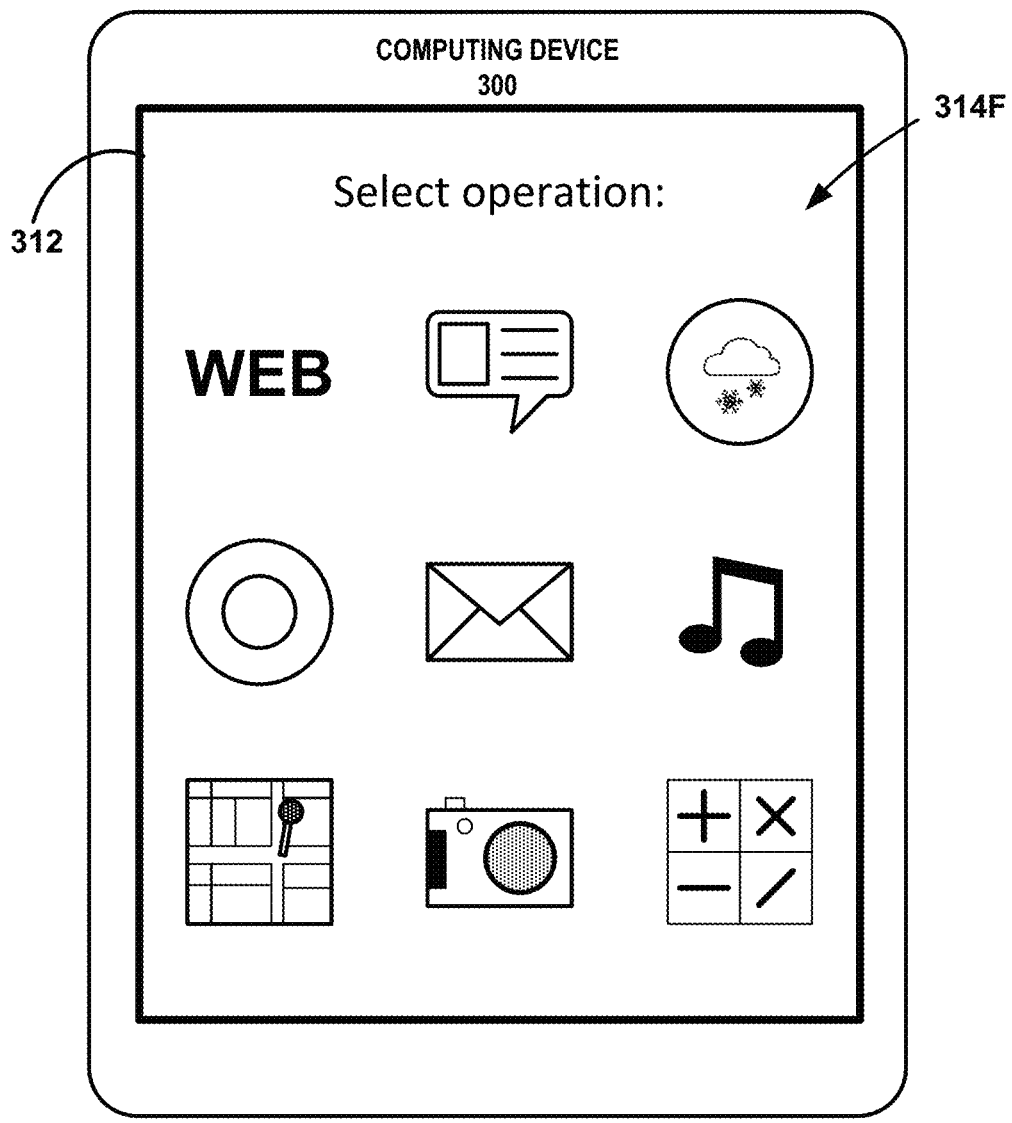

For example, in the example of FIG. 3E, computing device 300 may transition from operating in the locked-state to operating in an unlocked-state and immediately present a notification center graphical user interface from which a user can view notification information at display 312. And in the example of FIG. 3F, computing device 300 may transition from operating in the locked-state to operating in an unlocked-state and immediately present a home page or graphical user interface associated with an operating system or platform executing at presence-sensitive display 312 from which a user can access information or features of computing device 300.

Figure 4:
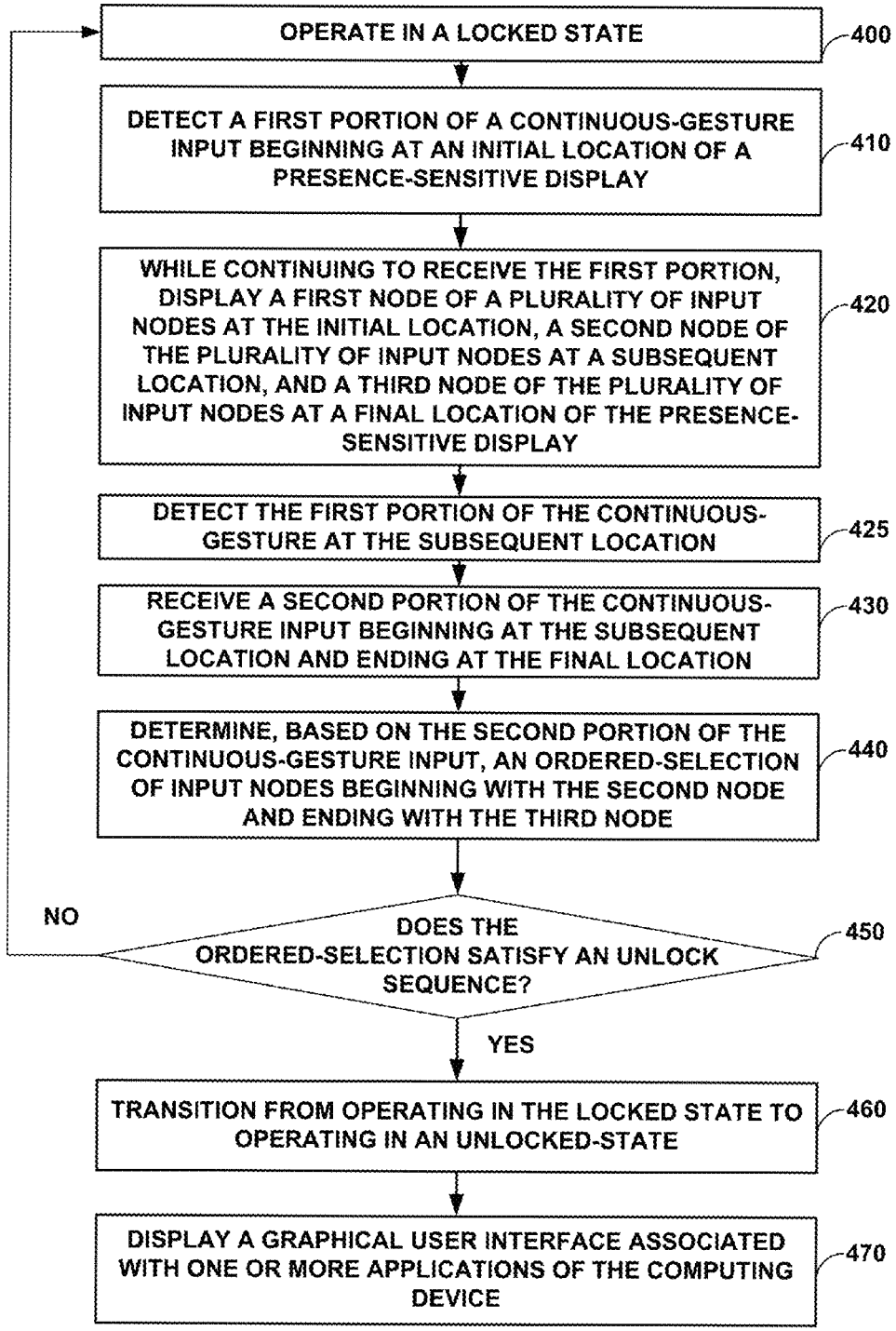
FIG. 4 is a flow diagram illustrating an example operation of a computing device that is configured to provide a lock screen graphical user interface, in accordance with techniques of this disclosure.

FIG. 4 is a flow diagram illustrating an example operation of a computing device that is configured to provide a lock screen graphical user interface, in accordance with techniques of this disclosure. The process of FIG. 4 may be performed by one or more processors of a computing device, such as computing device 100 of FIG. 1 and/or computing device 200 of FIG. 2. The steps of the process of FIG. 4 may in some examples, be repeated, omitted, and/or performed in any order. For purposes of illustration, FIG. 4 is described below within the context of computing device 100 of FIG. 1.

In the example of FIG. 4, computing device 100 may operate (400) in a locked-state in which computing device 100 limits or prevents access to information and/or features of computing device 100. Computing device 100 may receive (410) a first portion of a continuous-gesture input beginning at an initial location of presence-sensitive display 112. For example, a user of computing device 100 may begin providing continuous-gesture input 140 at location 160A by performing a touch-down event with a finger or stylus at location 160A as the user touches or hovers over location 160A.

Responsive to and while continuing to receive the first portion of continuous-gesture input 140, computing device 100 may display (420) a first node of a plurality of input nodes at the initial location, a second node of the plurality of input nodes at a subsequent location, and a third node of the plurality of input nodes at a final location. For example, in response to detecting the user contact at location 160A of presence-sensitive display 112, access module 120 may cause presence-sensitive display to wake-up and present input nodes 154. Access module 120 may cause presence-sensitive display 112 to present input nodes 154 with input node 154E at location 160A, input node 154D at location 160B, and input node 154I at location 160C.

Computing device 100 may detect (425) the first portion of continuous-gesture input 140 at the subsequent location. For example, while receiving the first portion of continuous-gesture input 140 (e.g., without detecting any lift-off events), access module 120 may determine that the first portion of the continuous-gesture initially includes one or more touch events with location components that are associated with node 154E and then includes one or more touch events with location components that are associated with node 154D.

Responsive to detecting the first portion of continuous-gesture input 140 at the subsequent location of presence-sensitive display 112, computing device 100 may receive (430) a second portion of the continuous-gesture input beginning at the subsequent location and ending at the final location. Responsive to determining that the first portion of continuous-gesture input 140 includes touch events from two different nodes, access module 120 may begin interpreting the portions of continuous-gesture being received as a second portion of continuous-gesture from which access module 120 uses to validate the user. That is, after discarding the touch events associated with the first portion of continuous-gesture input 140 from memory, access module 120 may analyze the touch events associated with the second portion of continuous-gesture input 140 to determine an ordered-selection of input nodes that may satisfy an unlock sequence.

Computing device 100 may determine (440), based on the second portion of the continuous-gesture input, an ordered-selection of input nodes beginning with input node 154D and ending with input node 154I. For example, still after performing a single touch-down event at location 160A, and prior to performing any lift-off events, the user of computing device 100 may finish performing continuous-gesture 140 by drawing over locations of input nodes 154A, 154B, 154F, and 154I. At input node 154I, the user may perform a lift-off event at location 160C to end continuous-gesture input 140. Access module 120 may compare the location components of the touch events associated with the second portion of continuous-gesture input 140 to the locations of input nodes 154 and determine an ordered-selection of input nodes 154 that includes node 154D, 154A, 154B, 154F, and 154I.

Computing device 100 may determine (450) whether the ordered-selection satisfies an unlock sequence. For example, access module 120 may compare the ordered-selection to one or more unlock patters stored at unlock pattern data store 122. Responsive to identifying a match, access module 120 may cause computing device 100 to transition (460) from operating in the locked-state to operating in an unlocked-state. Responsive to not identifying a match, access module 120 may cause computing device 100 to continue to operate (400) in the locked-state.

For example, each input node 154 may correspond to a different integer (e.g., zero or one through nine) and the ordered-selection determined by access module 120 may correspond to a sequence of integers (e.g., four-one-two-six-nine). Access module 120 may determine that the ordered-selection satisfies an unlock sequence if access module 120 identifies a sequence of integers stored at unlock patterns data store 122 that matches the sequence of integers derived from the ordered-selection.

After transitioning from the locked-state to the unlocked-state, computing device 100 may display (470) a graphical user interface associated with one or more application of computing device 100. For example, in some examples, after validating user input, and after computing device 100 transitions to an unlocked-state, access module 120 may configure computing device 100 to present a graphical user interface associated with one or more applications (e.g., such as application modules 224). In some examples, after unlocking device 100, access module 120 may cause computing device 100 to present a notification center graphical user interface as the first screen the user views at presence-sensitive display 112 after providing continuous-gesture input 140.

FIGS. 5A-5D are conceptual illustrations of screen shots 514A-314D as example lock screen graphical user interfaces displayed by computing device 500, in accordance with techniques of this disclosure. Computing device 500 of FIGS. 5A-5D includes presence-sensitive display 512 and is described below within the context of computing device 100 of FIG. 1 and/or computing device 200 of FIG. 1. Computing device 500 in some examples represents an example of computing device 100 of FIG. 1, an example of computing device 200 of FIG. 2, or both.

Figure 5A:
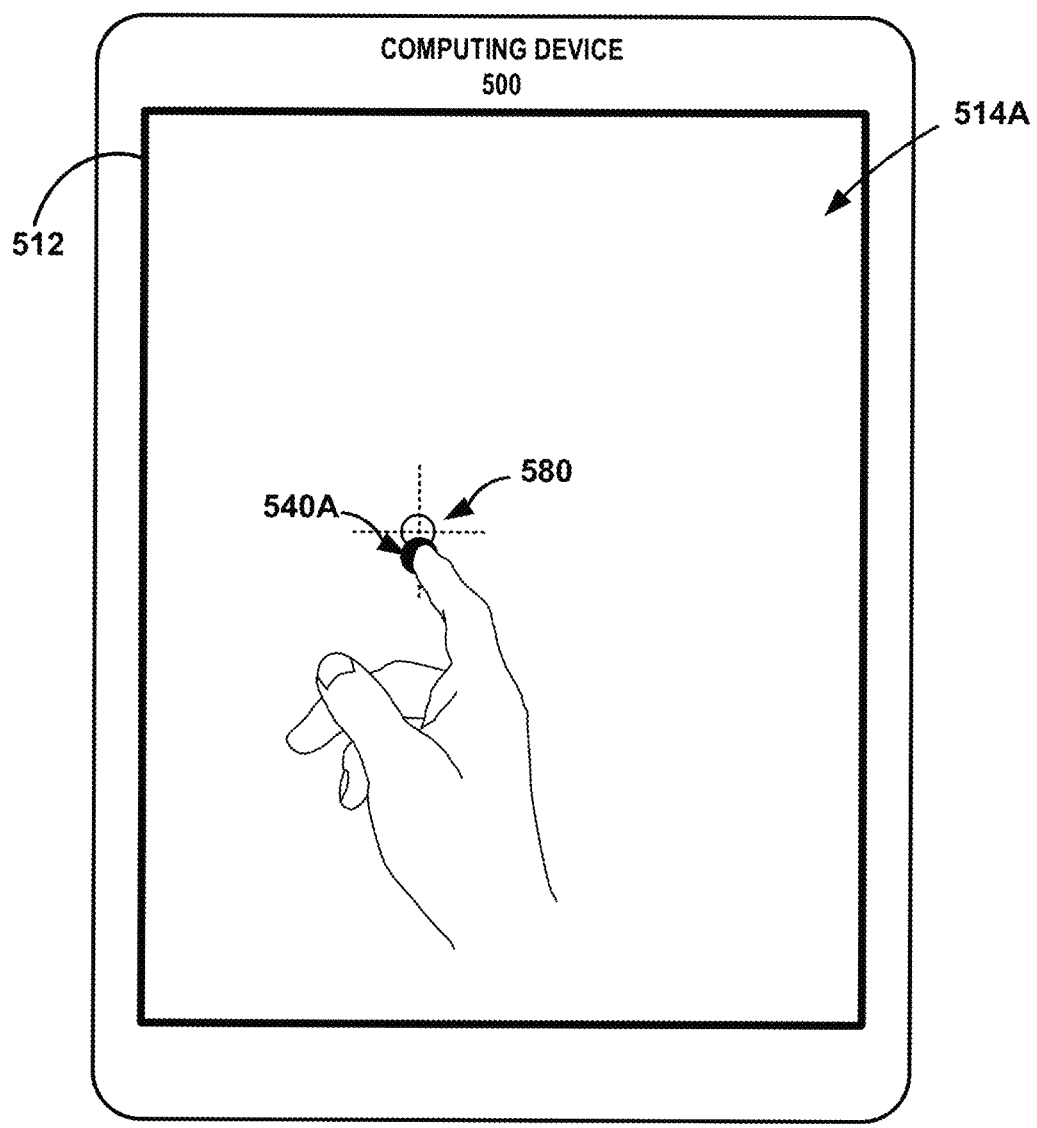
FIGS. 5A-5D are conceptual illustrations of an example lock screen graphical user interface, in accordance with techniques of this disclosure.

In the example of FIG. 5A, computing device 500 is operating in a locked-state. While operating in the locked-state, computing device 500 detects, beginning at location 580 of presence-sensitive display 512, portion 540A of continuous gesture 540. For example, a user of computing device 500 may perform a press-and-hold type gesture with a finger, a stylus, or other appendage or pointing device, at location 580 of presence-sensitive display 312.

Figure 5B:
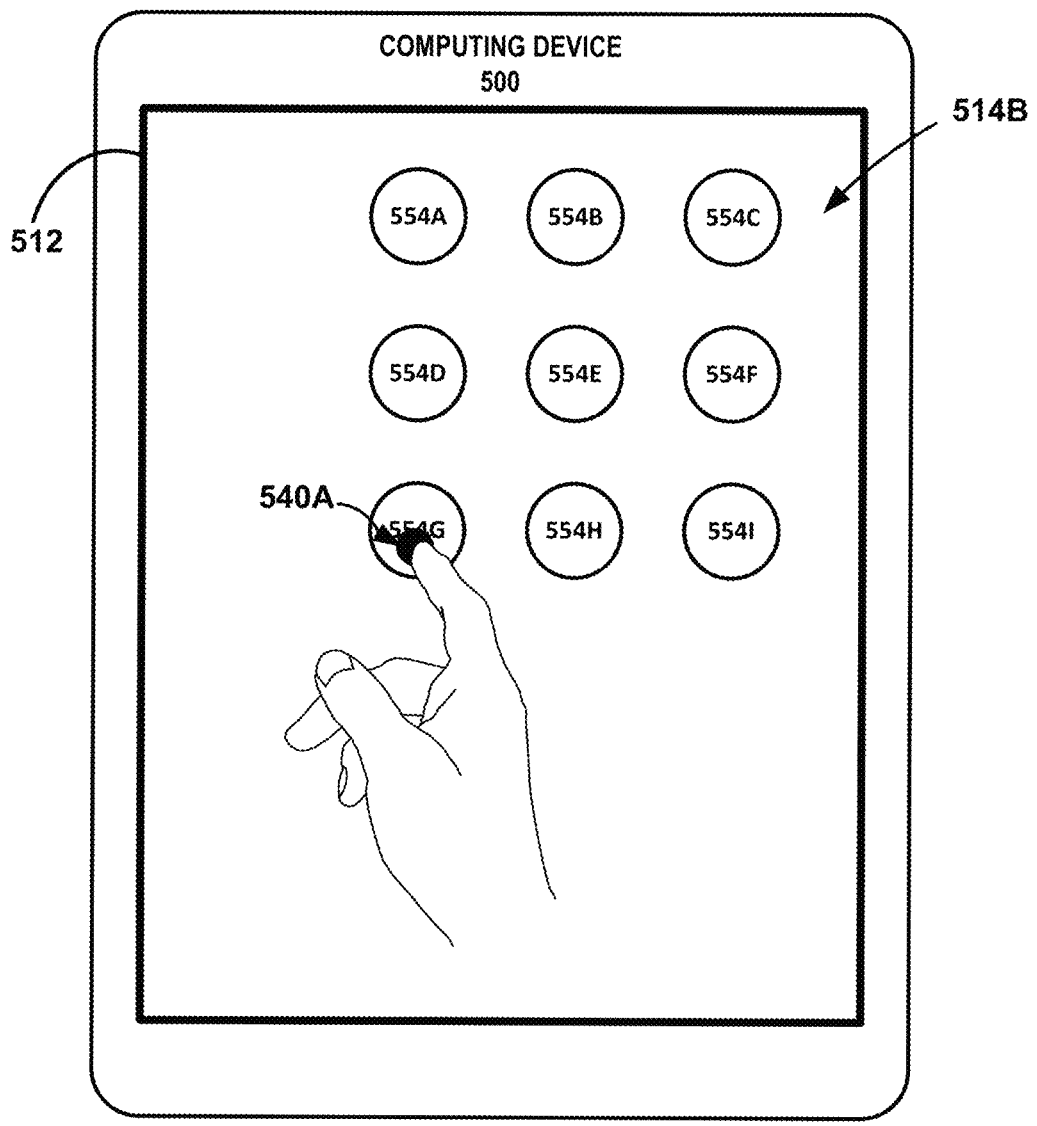

In the example of FIG. 5B, responsive to receiving portion 540A of continuous-gesture input 540 and while receiving portion 540A of continuous-gesture input 540, computing device 500 may output, for display at presence-sensitive display 512, a plurality of input nodes 554A-554I (collectively "input nodes 554"). Computing device 500 may cause presence-sensitive display 512 to present input node 554G at location 580 (at the initial location at which portion 540A was first received) and the other nodes 554 at subsequent locations.

Figure 5C:
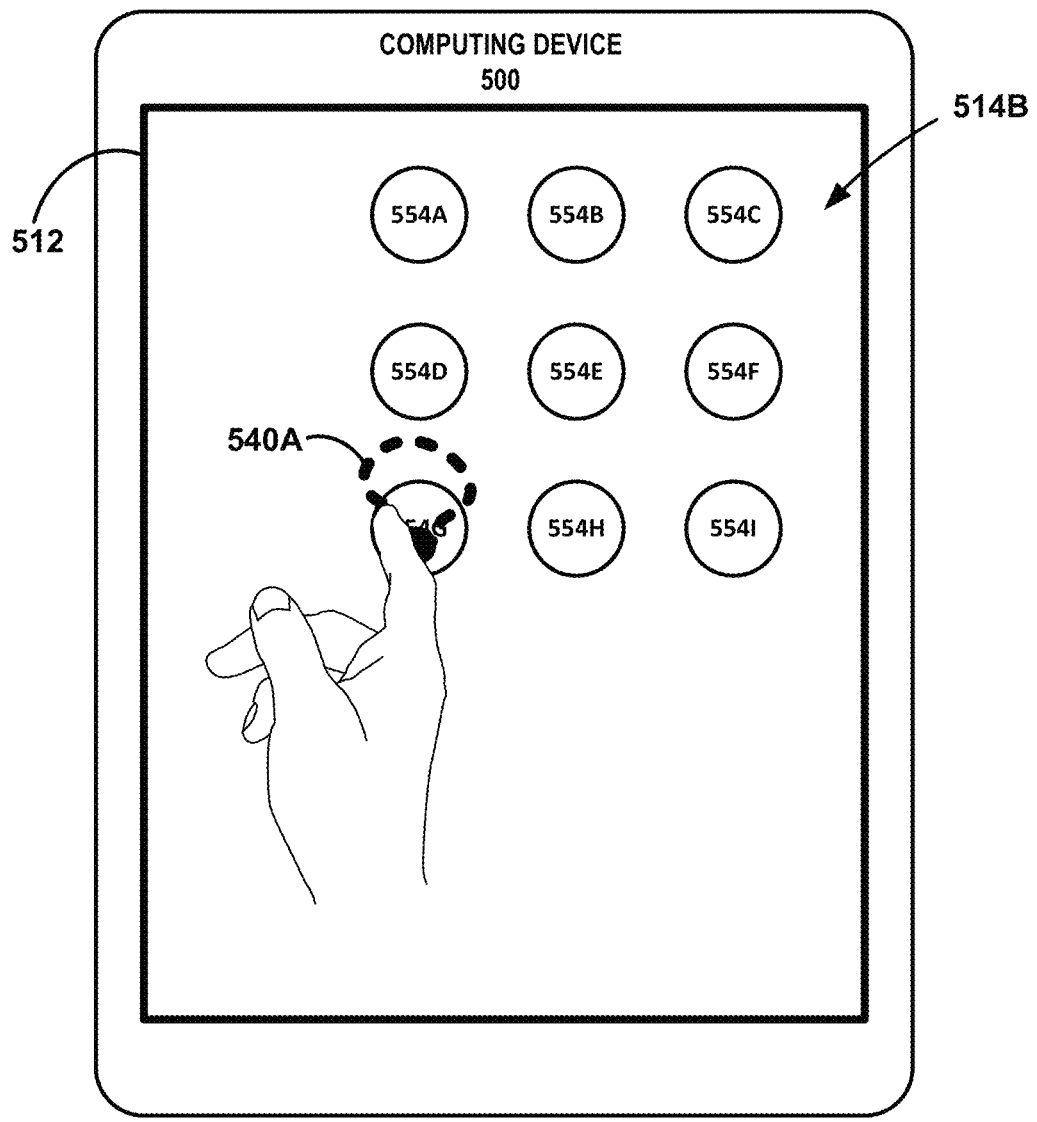
Figure 5D:
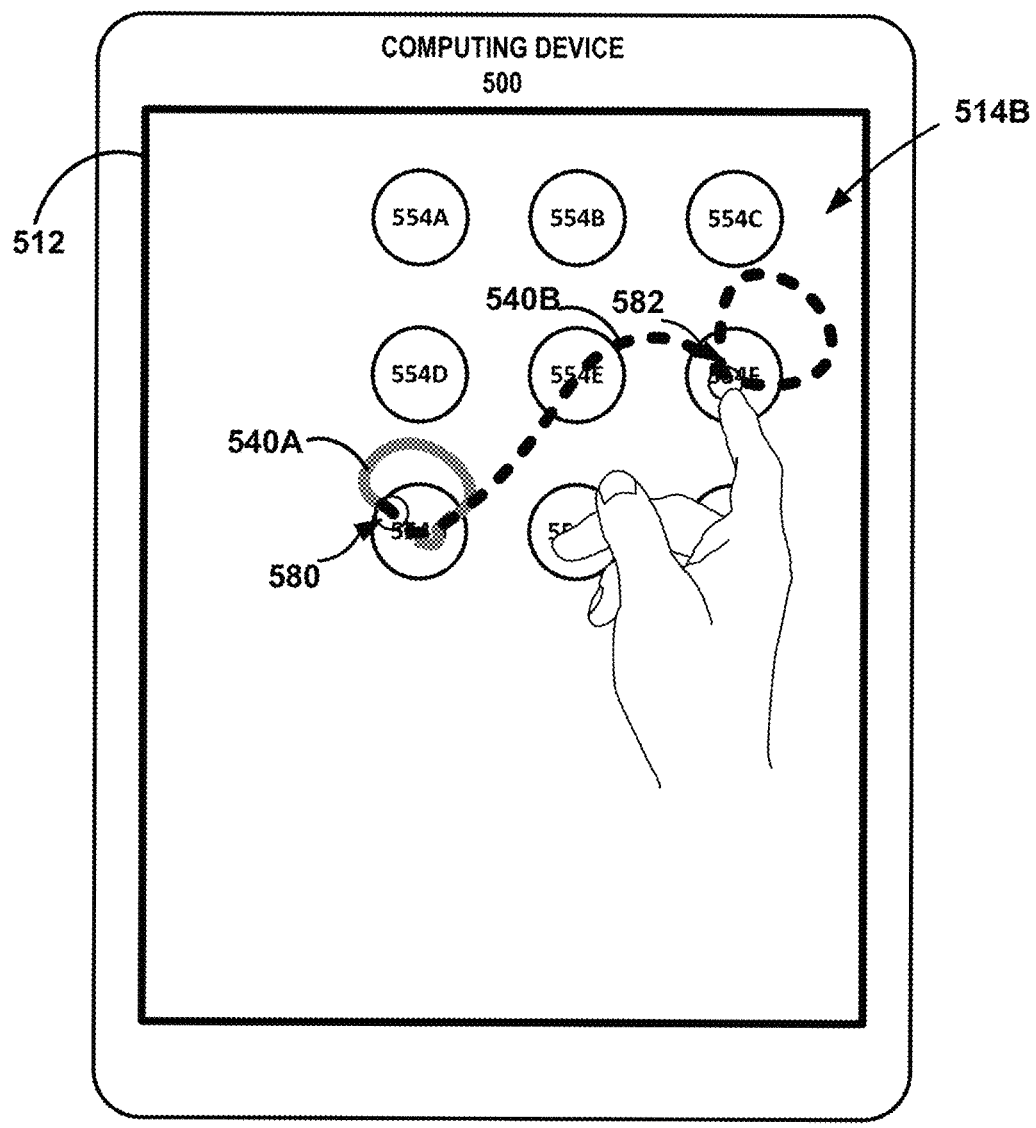

In the example of FIG. 5C, computing device 500 may continue to receive portion 540A of continuous-gesture input 540 as the user performs a curlicue pattern or loop pattern near node 554G. In other words, computing device 500 may detect a user gesturing away from location 580 and back to location 580 in a small circular pattern without gesturing at locations of any of the other nodes 554. In the example of FIG. 5D, computing device 500 may determine the end of portion 540A at location 580 and the beginning of portion 540B at location 580 in response to detecting the curlicue pattern at location 580.

In the example of FIG. 5D, computing device 500 may receive, beginning at location 580 and ending at location 582 of presence-sensitive display 512, portion 540B of continuous-gesture input 540. FIG. 5D shows a second curlicue pattern associated with gesture 540, this time, at or near location 582. Computing device 500 may interpret the curlicue pattern at location 582 as a double selection of node 554F. Said differently, computing device 500 may determine two subsequent selections of a single node 554F in response to detecting the curlicue pattern near node 554F.

Computing device 500 may determine, based on portion 540B of continuous-gesture input 540 and not based on portion 540A, an ordered-selection of input nodes 554 as node 554G, followed by node 554E, followed by node 554F—and lastly, followed by node 554F. Responsive to determining that the ordered-selection satisfies an unlock sequence, computing device 300 may transition from operating in the locked-state to operating in an unlocked-state. In other words, FIG. 5D shows that in some examples, computing device 500 may determine the ordered-selection of input nodes 554 by determining, based on the second portion 540B of continuous-gesture 540, a subsequent selection of fourth and fifth nodes 554 from the plurality of input nodes following an initial selection of the second node and preceding a final selection of the third node, wherein the ordered-selection is derived from the initial, subsequent, and final selections. In this case, the second node is node 554G, the third node being node 554F, and the fourth and fifth nodes being node 554E and 554F.

Clause 1. A method comprising: while a computing device is operating in a locked-state: detecting, by the computing device, beginning at an initial location of a presence-sensitive display, a first portion of a continuous-gesture input; responsive to detecting the first portion of the continuous-gesture input and while receiving the first portion of the continuous-gesture input, outputting, by the computing device, for display at the presence-sensitive display, a plurality of input nodes, wherein a first node of the plurality of input nodes is displayed at the initial location and a second node of the plurality of input nodes is display at a subsequent location; responsive to detecting the first portion of the continuous-gesture input at the subsequent location of the presence-sensitive display, receiving, by the computing device, beginning at the subsequent location of the presence-sensitive display and ending at a final location of the presence-sensitive display, a second portion of the continuous-gesture input, wherein a third node of the plurality of input nodes is displayed at the final location; determining, by the computing device, based on the second portion of the continuous-gesture input, an ordered-selection of input nodes from the plurality of input nodes beginning with the second node and ending with the third node; and responsive to determining that the ordered-selection satisfies an unlock sequence, transitioning, by the computing device, from operating in the locked-state to operating in an unlocked-state; and while the computing device is operating in the unlocked-state, outputting, by the computing device, for display at the presence-sensitive display, a graphical user interface associated with one or more applications of the computing device.

Clause 2. The method of clause 1, wherein determining the ordered-selection of input nodes comprises determining, by the computing device, based on the second portion of the continuous-gesture, a subsequent selection of fourth and fifth nodes from the plurality of input nodes following an initial selection of the second node and preceding a final selection of the third node, wherein the ordered-selection is derived from the initial, subsequent, and final selection.

Clause 3. The method of clause 2, wherein at least one of: the second node and the fourth node are first identical nodes; the fourth node and the fifth node are second identical nodes; or the fifth node and the third node are third identical nodes.

Clause 4. The method of any of clauses 1-3, wherein determining the ordered-selection of input nodes comprises determining, by the computing device, based on the second portion of the continuous-gesture, two subsequent selections of a single node from the plurality of input nodes in response to detecting a curlicue pattern near the single node, wherein the ordered-selection includes the two subsequent selections of the single node.

Clause 5. The method of any of clauses 1-4, wherein the third node corresponds to the first node.

Clause 6. The method of any of clauses 1-5, wherein the first node is a central node of the plurality of input nodes.

Clause 7. The method of any of clauses 1-6, further comprising: detecting, by the computing device, an inflection point associated with the first portion of the continuous-gesture that occurs at the subsequent location, wherein the computing device begins receiving the second portion of the continuous-gesture in response to detecting the inflection point.

Clause 8. The method of any of clauses 1-7, further comprising: detecting, by the computing device, a pause associated with the first portion of the continuous-gesture that occurs at the subsequent location, wherein the computing device begins receiving the second portion of the continuous-gesture in response to detecting the pause.

Clause 9. The method of any of clauses 1-8, wherein: each input node of the plurality of input nodes corresponds to a different integer; the ordered-selection corresponds to a first sequence of integers; the unlock sequence corresponds to a second sequence of integers; and determining that the ordered-selection satisfies the unlock sequence comprises determining, by the computing device, that the first sequence of integers corresponds to the second sequence of integers.

Clause 10. The method of any of clauses 1-9, further comprising: while receiving the first portion of the continuous-gesture input, determining, by the computing device, first touch events associated with the first portion of the continuous-gesture input; and while receiving the second portion of the continuous-gesture input, determining, by the computing device, second touch events associated with the second portion of the continuous-gesture input, wherein determining the ordered-selection comprises determining the ordered-selection based on the second touch events and not based on the first touch events.

Clause 11. The method of clause 10, further comprising: responsive to receiving the second portion of the continuous-gesture input, discarding, by the computing device, the first touch events from a memory.

Clause 12. A computer-readable storage medium comprising instructions that, when executed, cause at least one processor of a computing device to: while operating in a locked-state: detect, beginning at an initial location of a presence-sensitive display, a first portion of a continuous-gesture input; responsive to detecting the first portion of the continuous-gesture input and while receiving the first portion of the continuous-gesture input, output, for display at the presence-sensitive display, a plurality of input nodes, wherein a first node of the plurality of input nodes is displayed at the initial location and a second node of the plurality of input nodes is display at a subsequent location; responsive to detecting the first portion of the continuous-gesture input at the subsequent location of the presence-sensitive display, receive, beginning at the subsequent location of the presence-sensitive display and ending at a final location of the presence-sensitive display, a second portion of the continuous-gesture input, wherein a third node of the plurality of input nodes is displayed at the final location; determine, based on the second portion of the continuous-gesture input, an ordered-selection of input nodes from the plurality of input nodes beginning with the second node and ending with the third node; and responsive to determining that the ordered-selection satisfies an unlock sequence, transition from operating in the locked-state to operating in an unlocked-state; and while operating in the unlocked-state, output, for display at the presence-sensitive display, a graphical user interface associated with one or more applications of the computing device.

Clause 13. The computer-readable storage medium of clause 12, wherein the instructions, when executed, further cause the at least one processor to determine the ordered-selection of input nodes by at least determining, based on the second portion of the continuous-gesture, a subsequent selection of fourth and fifth nodes from the plurality of input nodes following an initial selection of the second node and preceding a final selection of the third node, wherein the ordered-selection is derived from the initial, subsequent, and final selections.

Clause 14. The computer-readable storage medium of clause 13, wherein at least one of: the second node and the fourth node are first identical nodes; the fourth node and the fifth node are second identical nodes; or the fifth node and the third node are third identical nodes.

Clause 15. The computer-readable storage medium of any of clauses 12-14, wherein the instructions, when executed, further cause the at least one processor to determine the ordered-selection of input nodes by at least determining, based on the second portion of the continuous-gesture, two subsequent selections of a single node from the plurality of input nodes in response to detecting a curlicue pattern near the single node, wherein the ordered-selection includes the two subsequent selections of the single node.

Clause 16. The computer-readable storage medium of any of clauses 12-15, wherein the instructions, when executed, further cause the at least one processor to begin receiving the second portion of the continuous-gesture in response to at least one of: detecting an inflection point associated with the first portion of the continuous-gesture that occurs at the subsequent location; or detecting a pause associated with the first portion of the continuous-gesture that occurs at the subsequent location.

Clause 17. A computing device comprising: a presence-sensitive display; at least one processor; and at least one module operable by the at least one processor to: detect, beginning at an initial location of the presence-sensitive display, a first portion of a continuous-gesture input; responsive to receiving the first portion of the continuous-gesture input and while receiving the first portion of the continuous-gesture input, output, for display at the presence-sensitive display, a plurality of input nodes, wherein a first node of the plurality of input nodes is displayed at the initial location and a second node of the plurality of input nodes is display at a subsequent location; responsive to detecting the first portion of the continuous-gesture input at the subsequent location of the presence-sensitive display receive, beginning at the subsequent location of the presence-sensitive display and ending at a final location of the presence-sensitive display, a second portion of the continuous-gesture input, wherein a third node of the plurality of input nodes is displayed at the final location; determine, based on the second portion of the continuous-gesture input, an ordered-selection of input nodes from the plurality of input nodes beginning with the second node and ending with the third node; and responsive to determining that the ordered-selection satisfies an unlock sequence, transition from operating in the locked-state to operating in an unlocked-state; and while operating in the unlocked-state, output, for display at the presence-sensitive display, a graphical user interface associated with one or more applications of the computing device.

Clause 18. The computing device of clause 17, wherein the at least one module is further operable by the at least one processor to determine the ordered-selection of input nodes by at least determining, based on the second portion of the continuous-gesture, a subsequent selection of fourth and fifth nodes from the plurality of input nodes following an initial selection of the second node and preceding a final selection of the third node, wherein the ordered-selection is derived from the initial, subsequent, and final selections.

Clause 19. The computing device of clause 18, wherein at least one of: the second node and the fourth node are first identical nodes; the fourth node and the fifth node are second identical nodes; or the fifth node and the third node are third identical nodes.

Clause 20. The computing device of any of clauses 17-19, wherein the at least one module is further operable by the at least one processor to begin receiving the second portion of the continuous-gesture in response to at least one of: detecting an inflection point associated with the first portion of the continuous-gesture that occurs at the subsequent location; or detecting a pause associated with the first portion of the continuous-gesture that occurs at the subsequent location.

Clause 21. A system comprising means for performing any of the methods of clauses 1-11.

Clause 22. A computing device comprising means for performing any of the methods of clauses 1-11.

Clause 23. The computing device of clause 17 further comprising means for performing any of the methods of clauses 1-11.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperable hardware units, including one or more processors as described above, in conjunction with suitable software and/or firmware.

Various examples have been described. These and other examples are within the scope of the following claims.

What is claimed is:

1. A method comprising:
  while a computing device is operating in a locked-state:
    detecting, by the computing device, beginning at an initial location of a presence-sensitive display, a first portion of a continuous-gesture input;
    responsive to detecting the first portion of the continuous-gesture input and while receiving the first portion of the continuous-gesture input, outputting, by the computing device, for display at the presence-sensitive display, a plurality of input nodes, wherein a first node of the plurality of input nodes is displayed at the initial location and a second node of the plurality of input nodes is display at a subsequent location;

responsive to detecting the first portion of the continuous-gesture input at the subsequent location of the presence-sensitive display, receiving, by the computing device, beginning at the subsequent location of the presence-sensitive display and ending at a final location of the presence-sensitive display, a second portion of the continuous-gesture input, wherein a third node of the plurality of input nodes is displayed at the final location;

determining, by the computing device, based on the second portion of the continuous-gesture input, an ordered-selection of input nodes from the plurality of input nodes beginning with the second node and ending with the third node; and responsive to determining that the ordered-selection satisfies an unlock sequence, transitioning, by the computing device, from operating in the locked-state to operating in an unlocked-state; and while the computing device is operating in the unlocked-state, outputting, by the computing device, for display at the presence-sensitive display, a graphical user interface associated with one or more applications of the computing device.

2. The method of claim 1, wherein determining the ordered-selection of input nodes comprises determining, by the computing device, based on the second portion of the continuous-gesture, a subsequent selection of fourth and fifth nodes from the plurality of input nodes following an initial selection of the second node and preceding a final selection of the third node, wherein the ordered-selection is derived from the initial, subsequent, and final selections.

3. The method of claim 2, wherein at least one of:
the second node and the fourth node are first identical nodes;
the fourth node and the fifth node are second identical nodes; or
the fifth node and the third node are third identical nodes.

4. The method of claim 1, wherein determining the ordered-selection of input nodes comprises determining, by the computing device, based on the second portion of the continuous-gesture, two subsequent selections of a single node from the plurality of input nodes in response to detecting a curlicue pattern near the single node, wherein the ordered-selection includes the two subsequent selections of the single node.

5. The method of claim 1, wherein the third node corresponds to the first node.

6. The method of claim 1, wherein the first node is a central node of the plurality of input nodes.

7. The method of claim 1, further comprising:
detecting, by the computing device, an inflection point associated with the first portion of the continuous-gesture that occurs at the subsequent location, wherein the computing device begins receiving the second portion of the continuous-gesture in response to detecting the inflection point.

8. The method of claim 1, further comprising:
detecting, by the computing device, a pause associated with the first portion of the continuous-gesture that occurs at the subsequent location, wherein the computing device begins receiving the second portion of the continuous-gesture in response to detecting the pause.

9. The method of claim 1, wherein:
each input node of the plurality of input nodes corresponds to a different integer;
the ordered-selection corresponds to a first sequence of integers;

the unlock sequence corresponds to a second sequence of integers; and determining that the ordered-selection satisfies the unlock sequence comprises determining, by the computing device, that the first sequence of integers corresponds to the second sequence of integers.

10. The method of claim 1, further comprising:
while receiving the first portion of the continuous-gesture input, determining, by the computing device, first touch events associated with the first portion of the continuous-gesture input; and while receiving the second portion of the continuous-gesture input, determining, by the computing device, second touch events associated with the second portion of the continuous-gesture input, wherein determining the ordered-selection comprises determining the ordered-selection based on the second touch events and not based on the first touch events.

11. The method of claim 10, further comprising:
responsive to receiving the second portion of the continuous-gesture input, discarding, by the computing device, the first touch events from a memory.

12. A non-transitory computer-readable storage medium comprising instructions that, when executed, cause at least one processor of a computing device to:
while operating in a locked-state:
detect, beginning at an initial location of a presence-sensitive display, a first portion of a continuous-gesture input;
responsive to detecting the first portion of the continuous-gesture input and while receiving the first portion of the continuous-gesture input, output, for display at the presence-sensitive display, a plurality of input nodes, wherein a first node of the plurality of input nodes is displayed at the initial location and a second node of the plurality of input nodes is display at a subsequent location;
responsive to detecting the first portion of the continuous-gesture input at the subsequent location of the presence-sensitive display, receive, beginning at the subsequent location of the presence-sensitive display and ending at a final location of the presence-sensitive display, a second portion of the continuous-gesture input, wherein a third node of the plurality of input nodes is displayed at the final location;
determine, based on the second portion of the continuous-gesture input, an ordered-selection of input nodes from the plurality of input nodes beginning with the second node and ending with the third node; and
responsive to determining that the ordered-selection satisfies an unlock sequence, transition from operating in the locked-state to operating in an unlocked-state; and while operating in the unlocked-state, output, for display at the presence-sensitive display, a graphical user interface associated with one or more applications of the computing device.

13. The non-transitory computer-readable storage medium of claim 12, wherein the instructions, when executed, further cause the at least one processor to determine the ordered-selection of input nodes by at least determining, based on the second portion of the continuous-gesture, a subsequent selection of fourth and fifth nodes from the plurality of input nodes following an initial selection of the second node and preceding a final selection of the third node, wherein the ordered-selection is derived from the initial, subsequent, and final selections.

14. The non-transitory computer-readable storage medium of claim 13, wherein at least one of:
the second node and the fourth node are first identical nodes;
the fourth node and the fifth node are second identical nodes; or
the fifth node and the third node are third identical nodes.

15. The non-transitory computer-readable storage medium of claim 12, wherein the instructions, when executed, further cause the at least one processor to determine the ordered-selection of input nodes by at least determining, based on the second portion of the continuous-gesture, two subsequent selections of a single node from the plurality of input nodes in response to detecting a curlicue pattern near the single node, wherein the ordered-selection includes the two subsequent selections of the single node.

16. The non-transitory computer-readable storage medium of claim 12, wherein the instructions, when executed, further cause the at least one processor to begin receiving the second portion of the continuous-gesture in response to at least one of:
detecting an inflection point associated with the first portion of the continuous-gesture that occurs at the subsequent location; or
detecting a pause associated with the first portion of the continuous-gesture that occurs at the subsequent location.

17. A computing device comprising:
a presence-sensitive display;
at least one processor; and
at least one module operable by the at least one processor to:
detect, beginning at an initial location of the presence-sensitive display, a first portion of a continuous-gesture input;
responsive to detecting the first portion of the continuous-gesture input and while receiving the first portion of the continuous-gesture input, output, for display at the presence-sensitive display, a plurality of input nodes, wherein a first node of the plurality of input nodes is displayed at the initial location and a second node of the plurality of input nodes is display at a subsequent location;
responsive to detecting the first portion of the continuous-gesture input at the subsequent location of the presence-sensitive display, receive, beginning at the subsequent location of the presence-sensitive display and ending at a final location of the presence-sensitive display, a second portion of the continuous-gesture input, wherein a third node of the plurality of input nodes is displayed at the final location;
determine, based on the second portion of the continuous-gesture input, an ordered-selection of input nodes from the plurality of input nodes beginning with the second node and ending with the third node; and
responsive to determining that the ordered-selection satisfies an unlock sequence, transition from operating in the locked-state to operating in an unlocked-state; and
while operating in the unlocked-state, output, for display at the presence-sensitive display, a graphical user interface associated with one or more applications of the computing device.

18. The computing device of claim 17, wherein the at least one module is further operable by the at least one processor to determine the ordered-selection of input nodes by at least determining, based on the second portion of the continuous-gesture, a subsequent selection of fourth and fifth nodes from the plurality of input nodes following an initial selection of the second node and preceding a final selection of the third node, wherein the ordered-selection is derived from the initial, subsequent, and final selections.

19. The computing device of claim 18, wherein at least one of:
the second node and the fourth node are first identical nodes;
the fourth node and the fifth node are second identical nodes; or
the fifth node and the third node are third identical nodes.

20. The computing device of claim 17, wherein the at least one module is further operable by the at least one processor to begin receiving the second portion of the continuous-gesture in response to at least one of:
detecting an inflection point associated with the first portion of the continuous-gesture that occurs at the subsequent location; or
detecting a pause associated with the first portion of the continuous-gesture that occurs at the subsequent location.

* * * * *

UNITED STATES PATENT AND TRADEMARK OFFICE
CERTIFICATE OF CORRECTION

| | | |
|---|---|---|
| PATENT NO. | : 9,710,639 B1 | Page 1 of 1 |
| APPLICATION NO. | : 14/853441 | |
| DATED | : July 18, 2017 | |
| INVENTOR(S) | : Gaurav Saini | |

It is certified that error appears in the above-identified patent and that said Letters Patent is hereby corrected as shown below:

Column 22, Line 38 (Claim 12): Replace "display at a subsequent location" with --displayed at a subsequent location--

Signed and Sealed this
Nineteenth Day of December, 2017

Joseph Matal
*Performing the Functions and Duties of the
Under Secretary of Commerce for Intellectual Property and
Director of the United States Patent and Trademark Office*